US008635151B2

(12) United States Patent  
Krajewski et al.

(10) Patent No.: US 8,635,151 B2  
(45) Date of Patent: Jan. 21, 2014

(54) METHOD AND SYSTEM FOR HANDLING METHOD LEVEL PROCESSING IN CONNECTION WITH CARDHOLDER ACCOUNT PROCESSING

(75) Inventors: Steve R. Krajewski, Omaha, NE (US); Keith A. Rose, Omaha, NE (US); Rebecca J. Cash, Omaha, NE (US); Molly Plozay, Omaha, NE (US); Richard L. Savage, Salt Lake City, UT (US); Tod O. Brockley, Omaha, NE (US); Jeffery S. Harden, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1706 days.

(21) Appl. No.: 10/917,854

(22) Filed: Aug. 13, 2004

(65) Prior Publication Data

US 2005/0080726 A1    Apr. 14, 2005

Related U.S. Application Data

(63) Continuation-in-part of application No. 10/321,287, filed on Dec. 17, 2002, now abandoned, which is a continuation-in-part of application No. 10/098,586, filed on Mar. 14, 2002, now Pat. No. 7,447,657.

(51) Int. Cl.  
  *G06Q 40/00*    (2012.01)
(52) U.S. Cl.  
  USPC ............................................. 705/39; 705/35
(58) Field of Classification Search  
  USPC ............................................. 705/35, 38, 39  
  See application file for complete search history.

(56) References Cited

U.S. PATENT DOCUMENTS

| 5,970,478 | A | * | 10/1999 | Walker et al. ................ 705/35 |
| 6,018,718 | A | * | 1/2000 | Walker et al. ............. 705/14.17 |
| 6,202,005 | B1 | | 3/2001 | Mahaffey |
| 6,349,242 | B2 | | 2/2002 | Mahaffey |
| 6,374,230 | B1 | | 4/2002 | Walker et al. |
| 7,092,905 | B2 | | 8/2006 | Behrenbrinker et al. |
| 2002/0069122 | A1 | | 6/2002 | Yun et al. |
| 2002/0123960 | A1 | | 9/2002 | Ericksen |
| 2002/0152116 | A1 | | 10/2002 | Yan et al. |
| 2003/0004868 | A1 | | 1/2003 | Early et al. |
| 2003/0046222 | A1 | * | 3/2003 | Bard et al. ................... 705/38 |
| 2003/0101131 | A1 | | 5/2003 | Warren et al. |

OTHER PUBLICATIONS

Higgins, Kevin T., Credit Card management, 1993, vol. 5 No. 12, pp. 58-66.  
Kaufeld, John, "Paradox 5 for Windows for Dummies," 1994, IDG Books Worldwide, Inc., 20, 21, 63-76, 92-99, 177-181, and 273-278.

* cited by examiner

*Primary Examiner* — Ojo O Oyebisi  
(74) *Attorney, Agent, or Firm* — Kilpatrick Townsend & Stockton LLP

(57) ABSTRACT

Methods and systems are provided for managing a financial account in which account information is maintained for the financial account on a host system. The account information includes a set of account parameter values and a specification of a base account processing strategy. An entry in a lookup table is maintained on a storage device in communication with the host system is accessed. The entry is defined by at least one of the account parameter values. An operation specified by the entry and inconsistent with operations specified by the base account processing strategy is implemented to override at least a portion of the base account processing strategy. The base account processing strategy is reverted to with the host system in response to satisfaction of a predetermined trigger condition.

11 Claims, 13 Drawing Sheets

310a — 410

| | Cardholder Income | | |
|---|---|---|---|
| | Under $25,000 | $25,000 - $50,000 | Over $50,000 |
| Cardholder Credit Score — Under 400 | AQ-C | AQ-C | AQ-G |
| 400 - 600 | AQ-C | AQ-G | AQ-P |
| Over 600 | AQ-G | AQ-P | AQ-P |

405

Account Age 415: <1 yr, 2 yrs, > 3 yrs

| | Transaction Type | |
|---|---|---|
| | Charitable | Non-Charitable |
| Cardholder Credit Score — Under 400 | BQ-X | BQ-X |
| 400 - 600 | BQ-Y | BQ-X |
| Over 600 | BQ-Z | BQ-X |

420

Account Age 430: <1 yr, 2 yrs, > 3 yrs

Fig. 4B

```
C M O  0 2 2 8 2 9 1 0 2 4 8 2 3 4 5 6
14:40:09 09/29/01          C M O                     PAGE 0001 OF 0001
D O E , J O H N ** 1 2 3 4  S  6 S T ** O M A H A * N E * 6 8 1 5 5 * 0 2 2 8 2 9 1 0 2 4 8 2 3 4 5 6

SEARCH DATE                M M / D D / Y Y Y Y

CHANGE    OLD       NEW           LOCK
TRANSACTION
     S/S/S     CODE    RESULT   RESULT  STATUS  SOURCE            DATE
 __ C P  IC  IM    S K    Z Z 0 0 0 1   B A 0 0 2 2    U                      9/22/YYYY
 __ C P  IC  B P   T K    Z Z 0 0 0 1   B A 0 0 2 2    L                      9/22/YYYY
 __ C P  IC  M P   T K    Z Z 0 0 0 1   B A 0 0 2 2    U                      9/22/YYYY
705 __ C P  IC  I P   M K    Z Z 0 0 0 1   B A 0 0 2 2    U                      9/22/YYYY
 __ C P  IC  M F   N U    Z Z 0 0 0 1   B A 0 0 2 2    U                      9/22/YYYY
 __ C P  IC  P E    # 1    Z Z 0 0 0 1   B A 0 0 2 2    L                      9/22/YYYY
 __ C P  IO  A C   M L    Z Z 0 0 0 1   B A 0 0 2 2    U                      9/22/YYYY
 __ C P  IO  C I    P 1    Z Z 0 0 0 1   B A 0 0 2 2    U                      9/22/YYYY

S . - SELECT           D - DISPLAY METHOD DESCRIPTION
    PF3 EXIT      PF7 PAGE BACK       PF8 PAGE FWD
```

Fig. 7A

```
14:40:09 09/29/01    OVERRIDE AUDIT HISTORY    PAGE 0001 OF 0001
760  D O E , J O H N ** 1 2 3 4  S  6 S T ** O M A H A * N E * 6 8 1 5 5 * 0 2 2 8 2 9 1 0 2 4 8 2 3 4 5 6
  TRAN                   OLD        NEW
  DATE     CA/AQ  S/S/S  RESULT    RESULT     ROW      REASON
 09/22/YYYY  AQ   CP IC IM ZZ0001  BA0022     369      NM Chng
   B/A      LOCK START    LOCK END           NEXT         NEXT          HONOR
   CODE       DATE          DATE            RESULT        DATE          NEXT
    B       MM/DD/YYYY    MM/DD/YYYY        ZZ0001        ZZ0001          0

ELEMENT    "DECISION ELEMENT DESCRIPTION"     TABLE         LAST
 OLD VALUE       "N"                             ID         DIFFERENT   765
 NEW VALUE       "Y"                           AAA001        ZZ0001

DECISION ELEMENTS
   ELEMENT     DATA          ELEMENT      DATA
  DEL TIMES 1+   N          DEC ELEM 6     Y
  DEC ELEM 2                DEC ELEM 7     Y
  DEC ELEM 3                DEC ELEM 8     Y     770
  DEC ELEM 4                DEC ELEM 9     Y
  DEC ELEM 5                DEC ELEM 10    Y

PF4/5  PREV/NEXT S/S/S   PF7/8 PREV/NEXT AUDIT RECORD
 PF10/11   PREV/NEXT DECISION ELEMENTS PF3 EXIT   PF12 RETURN
```

Fig. 7B

```
10/18/20YY 01:19              MLP AUDIT HISTORY              CMO PAGE 01 OF 01
TEST,JOHN*TEST,JOHN*10910 MILL VALLEY ROAD**OMAHA*NE*68154*022009002224177*0

SEARCH DATE:

CHANGE   OLD      NEW      LOCKED                TRANSACTION
 S/S/S   CODE     RESULT   RESULT   STATUS    SOURCE      DATE

CPPFOC  00                ABCD     U                     08/23/20YY
 CPPOCA           CPPOCA   CPPOCA                         07/24/20YY

S-SELECT DETAILED INFORMATION         D-DISPLAY METHOD DESCRIPTION
         PF3-EXIT                 PF7-PAGE BACK      PF8-PAGE FORWARD
                                                          V2DSACMO 00
```

Fig. 8A

```
10/18/20YY 01:22            OVERRIDE AUDIT HISTORY    M02    RECORD # 02
TEST,JOHN*TEST,JOHN*10910 MILL VALLEY ROAD**OMAHA*NE*68154*022009002224177*0

TRAN                     OLD       NEW
DATE       CA/AQ  S/S/S  RESULT    RESULT    ROW      REASON
08/23/20YY AQ     CPPFOC           ABCD      00001    CYC ALLO
 B/A              LOCK START  LOCK END   NEXT      NEXT      HONOR
 CODE             DATE        DATE       RESULT    DATE      NEXT
 B                00/00/0000  00/00/0000           00/0000

ELEMENT                            TABLE      LAST
OLD VALUE                          ID         DIFFERENT
NEW VALUE                          CPPFOC
                 DECISION ELEMENTS
ELEMENT          DATA              ELEMENT                   DATA
SYSTEM NUMBER    0020

PF4/5 PREV/NEXT S/S/S       PF7/8 PREV/NEXT AUDIT RECORD
PF10/11 PREV/NEXT DECISION ELEMENTS    PF12 RETURN
```

Fig. 8B

```
@NPO
                        PRICING OVERRIDES                    11/07/YY    14:22
ACCOUNT   022009002224177        ┌852 ┌854      ┌856
 CURRENT      IMM OVERRIDE CHNG LK LOCK DT   UNLOCK DT   RE  AQ TBL
 NEXT             OVERRIDE CHNG    EFFECT DT    HONOR    B/A
 LAST DIFF        OVERRIDE CHNG
CASH ITEM
 (CP IO CI)
           842
LATE FEE
 (CP PF LC) 844

OVER LMT FEE   ABCD        00  U  99999999   99999999        CPPFOC
 (CP PF OC)                       000000     N
           846
RETURN FEE
 (CP PF RC) 848
MIN FINANCE
 (CP IC MF) 850

PF7 - PG UP    PF8 - PG DOWN PF12 - REFRESH
```

Fig. 8C

```
              CIMS TEST CLIENT                           11/07/20YY 14:25
            CLIENT  QUALIFICATION  COUNTS                    PAGE       1
CLIENT 8997   FUNCTION IM    SUB-FUNCTION ES
TYPE CA   AREA MO  ID CPICID     DATE 04/05/20YY    STATUS VALD
COMPLETE DATE 10/07/20YY

NEW        OLD              ACTIVE          INACTIVE

CPICID                      2,506             409
        CPICID     Z0001                0               1
                   (TOTAL)          2,506             410

PF3=EXIT              PF7/8=PAGING                        PF12=CANCEL
NO MORE DATA                                              V2DSESDT 00
```

METHOD AND SYSTEM FOR HANDLING METHOD LEVEL PROCESSING IN CONNECTION WITH CARDHOLDER ACCOUNT PROCESSING

CROSS REFERENCE TO RELATED APPLICATION

This application is a continuation-in-part application of U.S. patent application Ser. No. 10/321,287, entitled "METHOD AND SYSTEM FOR HANDLING METHOD LEVEL PROCESSING IN CONNECTION WITH CARDHOLDER ACCOUNT PROCESSING," filed Dec. 17, 2002, which is a continuation in part of U.S. patent application Ser. No. 10/098,586, entitled "METHOD AND SYSTEM FOR HANDLING METHOD LEVEL PROCESSING IN CONNECTION WITH CARDHOLDER ACCOUNT PROCESSING," filed Mar. 14, 2002, the entire disclosure of which is incorporated herein by reference for all purposes.

BACKGROUND OF THE INVENTION

The present application relates in general to pricing and processing of a financial account. More specifically, this application relates to systems and methods for controlling processing for an individual financial account based on characteristics of the financial account and behavior associated with the financial account.

Credit card issuers, such as banks, retailers, or other financial service providers, provide cardholders with credit card accounts. In a typical credit card agreement, the card issuer agrees to transfer funds to merchants in payment for goods and services received by the cardholder, and the cardholder agrees to repay the card issuer. The terms of the agreement also provide that the card issuer may impose various charges against the credit card account. For instance, cardholders are generally charged interest on their account balances. Cardholders may also be charged annual fees, as well as charges for late payments, returned checks, exceeding the stated limit on the credit card account, and the like. Credit card accounts are generally priced by establishing the amounts of the various fees, interest and other charges at levels that enable the card issuer to profit from providing the credit card account.

Account pricing has been implemented by defining a "pricing method" for each of the applicable fees, interest, and other charges. A pricing method establishes values for parameters that control the computation of a particular charge. For instance, an interest rate method might include parameters defining how to compute a balance (e.g., whether to compute it daily or monthly, what types of transactions to include) and a parameter establishing the value of the interest rate (e.g., a 15% annual percentage rate (APR)). A minimum payment method might include parameters establishing that the payment amount is equal to the larger of a dollar amount (e.g., $20) and a percentage of the outstanding balance (e.g., 2%). When the cardholder is billed, the pricing methods are used to control computation of the charges imposed by the card issuer. For instance, when the finance charge is determined, the computation of the account balance and the amount of interest to charge are controlled by parameters set by the interest rate method. When the minimum payment is computed, parameters of the minimum payment method are used to control the computation.

In addition to pricing, other methods may be defined to establish parameter values governing other aspects of cardholder account processing. For example, a statement-production method may be provided that sets parameters governing the type of paper to be used and the information to be included on statements sent to cardholders. In addition, the statement-production method may set parameters governing which inserts are to be included with the statement when it is mailed. In another example, methods may also be defined to establish parameter values related to incentive or rewards programs, such as frequent flier miles or rebates awarded based on purchasing activity. A rewards method typically sets parameter values for computing rewards points earned for various transactions (e.g., one rewards point for each dollar spent in a purchase transaction), and so on. In short, an "account processing method" (or "processing method") may be provided for any aspect of cardholder account processing that is amenable to control via parameter values.

A pricing "strategy" is established by defining a pricing method for each charge that could be imposed. For instance, one pricing strategy may include a first method establishing an interest rate of 15% (APR) computed on a daily balance, a second method establishing a minimum payment amount of $20 or 2% of the account balance, a third method establishing a late payment charge of $30, and so on. The pricing strategy may be expanded into a processing strategy by including additional methods not related to charges, such as statement production or rewards methods. Thus, a typical processing strategy includes many methods.

Many card issuers provide different types of card accounts with different terms and conditions, different rewards programs, and so on. These account types are generally implemented by defining multiple co-existing processing strategies, and assigning each account to one of the strategies. For instance, a card issuer may define a "classic" strategy, a "gold" strategy, and a "platinum" strategy, with the classic strategy including an interest rate of 18% and an annual fee of $20, the gold strategy including an interest rate of 16% and an annual fee of $25, and the platinum strategy including an interest rate of 15% and an annual fee of $50. The ability to assign individual cardholders to one of several co-existing strategies allows the card issuer to coordinate account pricing and other aspects of account processing with cardholder behavior to some extent.

Further coordination of account pricing and processing with cardholder behavior is desirable. For instance, a card issuer may desire to impose penalty pricing on individual cardholders who violate the terms and conditions of the cardholder agreement, e.g., by increasing the interest rate for cardholders who are delinquent in paying. As another example, a card issuer may desire to offer incentive pricing, such as a temporary reduction in the interest rate, in order to attract new cardholders or to encourage existing cardholders to increase their use of the issuer's cards. Such penalty or incentive pricing typically involves adjusting a small number of parameters within one or two account processing methods for the accounts of cardholders who qualify for the penalty or incentive.

Existing systems provide only limited ability to make such adjustments within an account processing method. In some systems, each account is assigned a processing strategy (e.g., "classic," "gold," or "platinum"), and the processing for all accounts assigned to that strategy is determined by the account processing methods that make up the assigned strategy. In such a system, adjusting a single processing parameter requires the card issuer to define a new strategy that differs from the old strategy in one account processing method. The card issuer must then identify the accounts to which the change should be applied and reassign those accounts to the new strategy. Subsequent changes intended to affect all cardholders must be made separately for each strategy, making this approach burdensome and inefficient.

Other existing systems allow the card issuer to override one or more of the processing parameters for an individual account by applying a method override that changes the value of one or more of the parameters of an account processing method. For instance, a penalty interest rate may be imposed by applying a method override to an account that changes the rate to a higher value but otherwise leaves the interest rate method unchanged. However, these systems provide limited functionality for identifying accounts to which a method override is to be applied. Generally, the card issuer must search account records to generate a list of qualifying accounts. Once the accounts are identified, applying a method override generally involves manually updating each account record. Subsequently removing the method override (to restore the default account processing method) involves a second manual update.

Hence, systems and methods for automatically adjusting individual price terms for a cardholder account would be desirable.

BRIEF SUMMARY OF THE INVENTION

Embodiments of the invention are thus directed to methods and systems for managing a financial account. Ordinarily, the financial account is managed according to a default processing strategy. In some instances, however, embodiments of the invention permit overrides of the default processing strategy. Such overrides may comprise one-time overrides or may comprise overrides that persist under some change in conditions. One consequence of such overrides is that it is possible to tailor processing strategies on an individualized basis for account holders rather than relying on the broader principles used in the default strategy.

Thus, in one set of embodiments, a method is provided for managing a financial account in which account information is maintained for the financial account on a host system. The account information includes a set of account parameter values and a specification of a base account processing strategy. An entry in a lookup table is maintained on a storage device in communication with the host system is accessed. The entry is defined by at least one of the account parameter values. An operation specified by the entry and inconsistent with operations specified by the base account processing strategy is implemented to override at least a portion of the base account processing strategy. The base account processing strategy is reverted to with the host system in response to satisfaction of a predetermined trigger condition.

In some such embodiments, account usage information for the financial account is also received with the host system, with the entry further defined by the account usage information. The lookup table may comprise a plurality of lookup tables. In such cases, an entry in a first of the lookup tables is accessed; this entry is defined according to one of the account usage information and account parameter values. An entry in a second of the lookup tables is also accessed; this entry is defined according to the other of the account usage information and account parameter values. The second of the lookup tables is identified by the entry in the first lookup table. The operation to override at least a portion of the base account processing strategy is specified by the entry in the second of the lookup tables. In one embodiment, a temporal lock period is specified, with reversion to the base account processing strategy being performed after passage of the temporal lock period.

In a second set of embodiments, a method is also provided for managing a financial account in which account information is maintained for the financial account on a host system. The account information includes a set of account parameter values and a specification of a base account processing strategy. An entry in a lookup table maintained on a storage device in communication with the host system is accessed. The entry is defined by at least one of the account parameter values. An operation specified by the entry and inconsistent with operations specified by the base account processing strategy is implemented to override at least a portion of the base account processing strategy. A temporal lock period is recorded with the host system. The temporal lock period is measured from a time of overriding the at least a portion of the base account processing strategy during which the override is prohibited from being removed.

In some such embodiments, the occurrence of a predetermined trigger condition is identified with the host system. It is determined, with the host system, whether a time of occurrence of the predetermined trigger condition is within the temporal lock period. The base account processing strategy is reverted to with the host system in response to the occurrence of the predetermined trigger condition if the time of occurrence of the predetermined trigger condition is within the temporal lock period. As in the previous set of embodiments, the lookup table may comprise a plurality of lookup tables. In such cases, an entry in a first of the lookup tables is accessed; this entry is defined according to one of the account usage information and account parameter values. An entry in a second of the lookup tables is also accessed; this entry is defined according to the other of the account usage information and account parameter values. The second of the lookup tables is identified by the entry in the first lookup table. The operation to override at least a portion of the base account processing strategy is specified by the entry in the second of the lookup tables. In different embodiments, the temporal lock period may be finite or may be indefinite.

In a further set of embodiments, a method is provided for maintaining a plurality of financial accounts. Account information is maintained for each of the plurality of accounts on a storage device. The account information for each account includes a set of respective account parameter values and a specification of a respective base account processing strategy. A hypothetical lookup table is received with a host system in communication with the storage device. The hypothetical lookup table corresponds to a hypothetical processing scenario for the plurality of accounts. Entries within the hypothetical lookup table are defined by at least one account parameter value and specify an account-processing override. A determination is made of which of the plurality of account have account information with respective account parameter values that would result in a change in the respective base account processing strategy by applying the account-processing override specified by the entries in the hypothetical lookup table defined by the respective account parameter values. A report is generated summarizing results of the determination.

In some such embodiments, account usage information is maintained on the storage device for each of the plurality of accounts. In such cases, entries within the hypothetical lookup table are further defined by account usage information. In one embodiment, the hypothetical lookup table comprises a plurality of hypothetical lookup tables. In that embodiment, entries within the hypothetical lookup table comprise entries within a first of the hypothetical lookup tables and entries within a second of the hypothetical lookup tables. The entries within the first of the hypothetical lookup tables are defined according to one of the account usage information and the account parameter values. The entries within the second of the hypothetical lookup tables are defined according to the other of the account usage information and the account parameter values. The second of the hypothetical lookup tables is identified by at least one of the entries within the first of the hypothetical lookup tables.

The methods of the present invention may be embodied in a computer-readable storage medium having a computer-readable program embodied therein for directing operation of a computer system. Such a computer system may include a processor and a storage device. The computer-readable program includes instructions for operating the computer system to manage financial accounts in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 4A and 4B are tables illustrating the contents of cardholder allocation tables according to exemplary embodiments of the present invention;

FIGS. 7A-B are screen shots showing a presentation of method override information for a cardholder account according to an exemplary embodiment of the present invention;

FIGS. 8A-8C are screen shots showing examples of customer-service interface information that may be provided by the system regarding method overrides;

DETAILED DESCRIPTION OF THE INVENTION

1. System Overview

Embodiments of the present invention will now be described. The present invention provides systems and methods for flexibly adjusting individual components of account processing based on characteristics and behavior of individual cardholders. In some embodiments, the components of account processing comprise fee-related parameters and, in other embodiments, the components of account processing comprise non-fee-related parameters. In an exemplary embodiment, each account is assigned a processing strategy that includes a set of account processing methods establishing parameters of account processing. Such parameters may include fee-related and/or non-fee-related parameters. One or more of the methods is made overrideable; in other words, a method override is provided that, when applied to an account, changes one or more of the parameters of an account processing method from the default values established by the processing strategy. Whether to apply each available method override to a particular financial account is determined automatically using decision rules related to one or more aspects of the account's characteristics and behavior associated with the account.

In the following, specific embodiments are discussed where the financial account comprises a credit account, such as a credit-card account, but the invention is not limited to such accounts and may be implemented for other financial accounts. For example, in one exemplary embodiment, a processing strategy includes an interest rate method for a credit account establishing an annual rate of 15%; this method may also establish other parameters (e.g., for computing the balance to which the annual rate is applied). A method override is provided that, when applied to an account, changes the interest rate for that account to 18% without affecting other parameters of the interest rate method. A decision rule is also provided that establishes that the method override is to be applied only to accounts with one or more delinquent payments and a balance between $1,000 and $5,000. An account record is reviewed to determine whether the account meets the criteria of the decision rule. If it does, then the method override is applied, and subsequent bills are computed using the 18% interest rate established by the method override and other parameters established by the interest rate method.

In some alternative embodiments, multiple method overrides may be associated with the same account processing method. For instance, for an interest rate method, there may be a first method override that changes the interest rate to 18% and a second method override that changes the interest rate to 21%. It will be appreciated that in this example, both method overrides would not be simultaneously applied to the same cardholder account, but the first method override could be applied to a first account while the second method override is applied to a second account and no method override is applied to a third account.

Figure 1A:
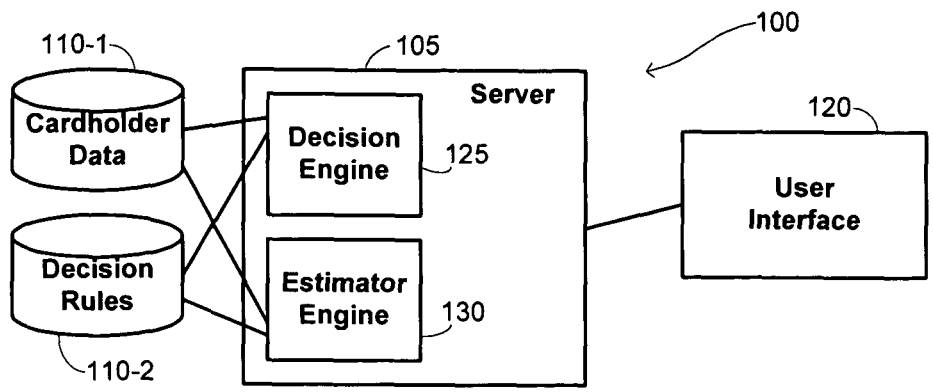
FIG. 1A is a simplified block diagram of a system for applying method overrides to credit card accounts according to an exemplary embodiment of the present invention.

FIG. 1A illustrates an exemplary embodiment of a system 100 for controlling the application of method overrides to cardholder accounts according to the present invention. A server 105 communicates with an account data store 110-1 that contains cardholder account information and with a rules data store 110-2 that contains decision rules governing the application of method overrides. Both the account data store 110-1 and the rules data store 110-2 are examples of storage devices 110 suitable for storing data. While they are shown as separate storage devices 110 in FIG. 1A, it will be appreciated that the data may alternatively be stored collectively on a single storage device 110 or may be stored on a number of storage devices 110 that exceeds two. Each of such storage devices 110 may be implemented, for example, using magnetic disk, tape, or any other computer-readable media, and each of such storage devices 110 may be local to server 105 or remote and accessible via a network. In one exemplary embodiment, server 105 is implemented as a computer system, as described in greater detail in connection with FIG. 1B. In some instances, the information on the storage devices 110 may be derived from multiple sources and is organized as described in copending, commonly assigned U.S. patent application Ser. No. 10/193,722, entitled "METHODS AND SYSTEMS FOR ORGANIZING INFORMATION FROM MULTIPLE SOURCES," filed Jul. 10, 2002 by Brian Friedman, the entire disclosure of which is incorporated herein by reference for all purposes.

A user interface 120 is provided to enable a user (such as an employee of the card issuer where the financial account comprises a credit-card account) to control various functionality of server 105, and to view and/or modify data in account data store 110-1 and/or rules data store 110-2. User interface 120 generally includes a display device (e.g., a monitor) for providing information to a user and an input device (e.g., a keyboard or touchscreen) for accepting input from a user. User interface 120 may also include other components, such as hardware and/or software security components to prevent unauthorized use. User interface 120 may be local to server 105 or remote and connected to server 105 via a network.

In an embodiment where the financial account comprises a credit-card account, the decision rules in rules data store 110-2 are defined by the card issuer for each overrideable method. The decision rules determine whether an available method override is to be applied to a cardholder account on the basis of one or more decision elements. Each decision element reflects one or more features of cardholder characteristics and behavior stored in an account record, such as the number of late payments, the age of the account, account balance, frequency of use of the card, total amount charged to the account over a fixed time period, payment history, cardholder income, cardholder credit rating, and the like. An example of an account record is discussed in greater detail in connection with FIG. 2 below. It will be appreciated that the number of decision elements may be quite large, and that any information related to cardholder characteristics and behavior may be used as a decision element. The decision rules may advantageously be implemented using a set of lookup tables, as will be described further below.

Server 105 operates a decision engine 125 for applying decision rules to account records. Decision engine 125 retrieves decision rules from rules data store 115 and an account record from account data store 110-1. Decision engine 125 then applies the decision rules to data in the account record in order to determine whether to apply a particular method override to the cardholder account. In one exemplary embodiment, decision engine 125 is also configured to update the account record in account data store 110 when a method override is to be applied or removed.

In an exemplary embodiment, decision engine 125 has several modes of operation. In a first operating mode, decision engine 125 reviews and updates each account record (or a selected subset of the account records) in account data store 110-1. In a second operating mode, decision engine 125 reviews some or all of the account records in account data store 110-1 without updating the account records; instead, decision engine 125 makes information from the review available to the card issuer, including whether any method overrides were selected for application to each cardholder account. In a third operating mode, decision engine 125 is used to process a new account application by determining the terms and conditions that would apply to a prospective new account. These operating modes will be described further below. It is to be understood that decision engine 125 may have more or fewer operating modes. The various operating modes of decision engine 125 may be controlled by an operator via user interface 120.

Figures 9A, 9B:
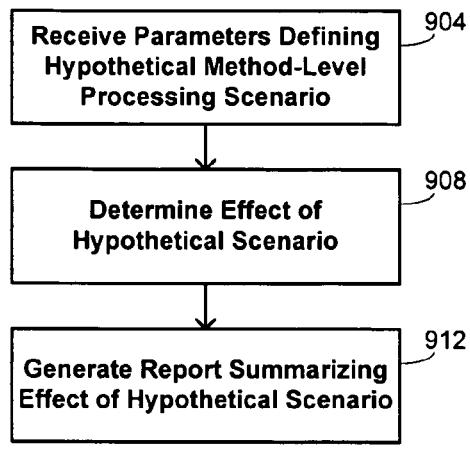
FIG. 9A is a flow chart illustrating a method for estimating the effect of method-override implementation changes in embodiments of the invention.
FIG. 9B is a screen shot illustrating the results of using an estimator engine to apply the method of FIG. 9A.

In addition to the decision engine, the server 105 may comprise an estimator engine 130 in some embodiments. The estimator engine may function similarly to the decision engine 125, but generally does so with hypothetical data in order to test the effect or scope of possible changes in implementing method-level processing. Further description of the operation of the estimator engine 130 is described in connection with FIGS. 9A and 9B below.

Figure 1B:
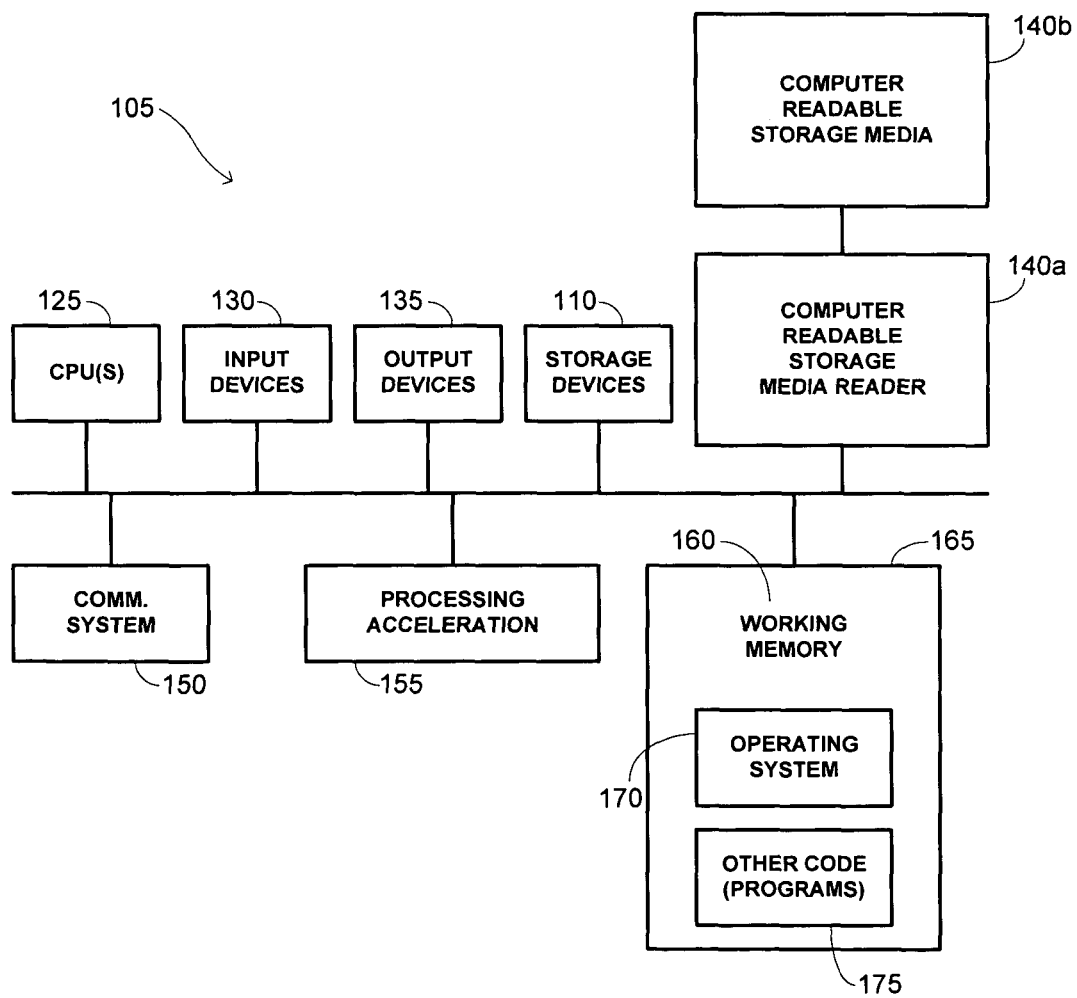
FIG. 1B provides a more detailed schematic view of a computer system on which methods of the invention may be embodied.

A structure for the server in one embodiment is shown schematically in FIG. 1B. This figure broadly illustrates how individual system elements may be implemented in a separated or more integrated manner. The server 105 is shown comprised of hardware elements that are electrically coupled via bus 145. In this embodiment, these hardware elements include the decision engine 125 and/or estimator engine 130 as one or more processors, one or more input devices 130, one or more output devices 135, a computer-readable storage media reader 140a, a communications system 150, a processing acceleration unit 155 such as a DSP or special-purpose processor, and a memory 160. The computer-readable storage media reader 140a is further connected to a computer-readable storage medium 140b, the combination comprehensively representing remote, local, fixed, and/or removable storage devices plus storage media for temporarily and/or more permanently containing computer-readable information. The communications system 150 may comprise a wired, wireless, modem, and/or other type of interfacing connection and permits data to be exchanged with the server 105, such as with the user interface 120. Thus, in this embodiment, the user interface 120 is remote from the server 105 and the storage devices 110 are local to the server 105, being configured for direct interaction with the decision engine 125 via bus 145.

The server 105 also comprises software elements, shown as being currently located within working memory 165, including an operating system 170 and other code 175, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

It will be appreciated that the description of system 100 herein is illustrative. The components described herein may be modified or varied, and more or fewer components may be used. Based on the disclosure and teachings herein, those of ordinary skill in the art will recognize other ways and/or methods of implementing the present invention.

Figure 1C:
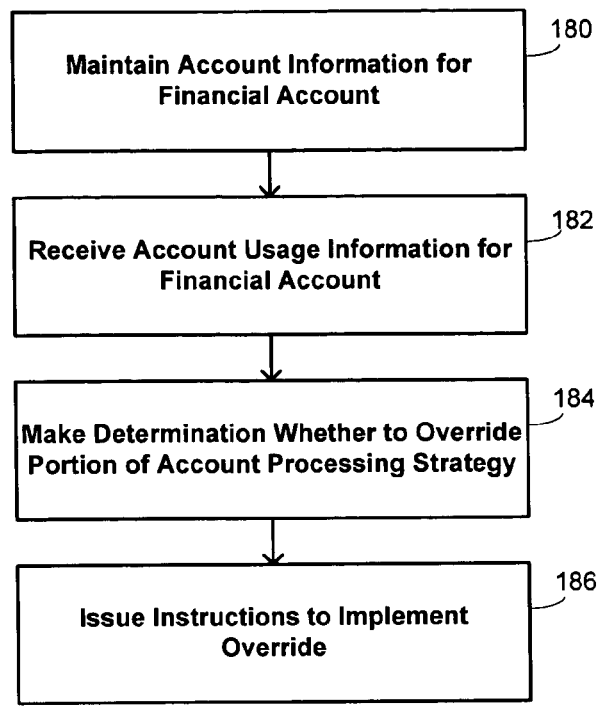
FIG. 1C is a flow diagram providing an overview of embodiments of the invention.

An overview of methods of certain embodiments of the invention is summarized in outline form in FIG. 1C. At block 180, account information for the financial account is maintained. This account information generally includes a set of account parameter values and a specification of an account processing strategy. At block 182, account usage information is received for the financial account. Such account usage information may comprise, for example, a history of transaction information and/or a history of payment information. In the case of a credit-card account, for example, transaction information includes all information related to transactions entered into by the cardholder, such as purchases and/or cash advances. Payment information includes all information related to payments by the cardholder to pay down the credit balance of the account. Thus, the account usage information may collectively encompass all information related to any changes in the account credit balance. At block 184, a determination is made whether to override at least a portion of the account processing strategy. Such a determination may be made by applying a decision method that considers the account parameter values and the account usage information. If a determination is made to override at least a portion of the account processing strategy, instructions to implement such an override are issued at block 186.

2. Account Information

Figure 2:
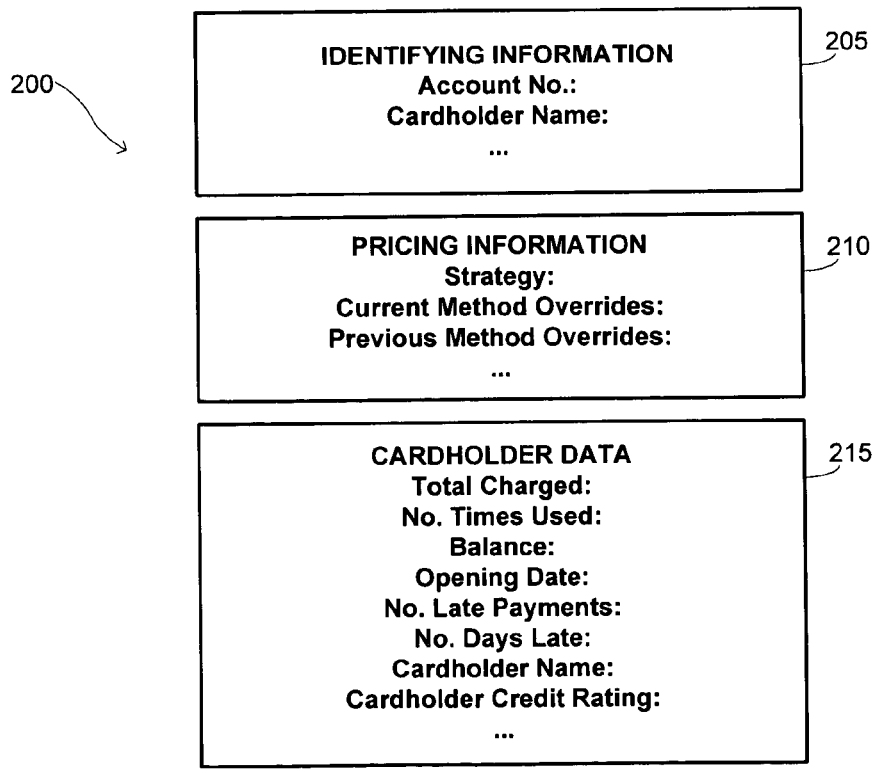
FIG. 2 is a simplified block diagram of a cardholder record according to an exemplary embodiment of the present invention.

The nature of the account information may be understood more clearly by considering a specific example in which the financial account comprises a credit-card account. In such instances, the cardholder account information in account data store 110-1 includes an account record (or cardholder record) corresponding to each cardholder account. An example of such an account record 200 is shown in FIG. 2. Each account record 200 may include identifying information 205 for the account (e.g., account number, cardholder name, etc.). Each account record 200 may also include processing information 210, such as an identifier indicating the processing strategy applied to the account and identifiers of any method overrides that are currently applied.

The method override information may be stored in one or more fields in cardholder record 200; for instance, a list of names of currently applied method overrides may be stored. In some embodiments, processing information 210 also includes processing history information related to formerly applied method overrides, i.e., method overrides that once were, but no longer are, applied to the account. The processing history information may be stored in a history file, and account record 200 may contain a reference to that file. Account record 200 also includes cardholder characteristics data 215, including account usage and payment patterns, cardholder income, cardholder credit score, etc.

It will be appreciated that FIG. 2 is illustrative and that other information may be stored in account record 200; for instance, data related to individual credit card transactions (e.g., where the card was used, the total amount of the transaction, the date of the transaction) may also be stored. Storage and management of account records 200 may be implemented using conventional database products, flat files, or any other data management technology.

3. Decision Rules

Figure 3A:
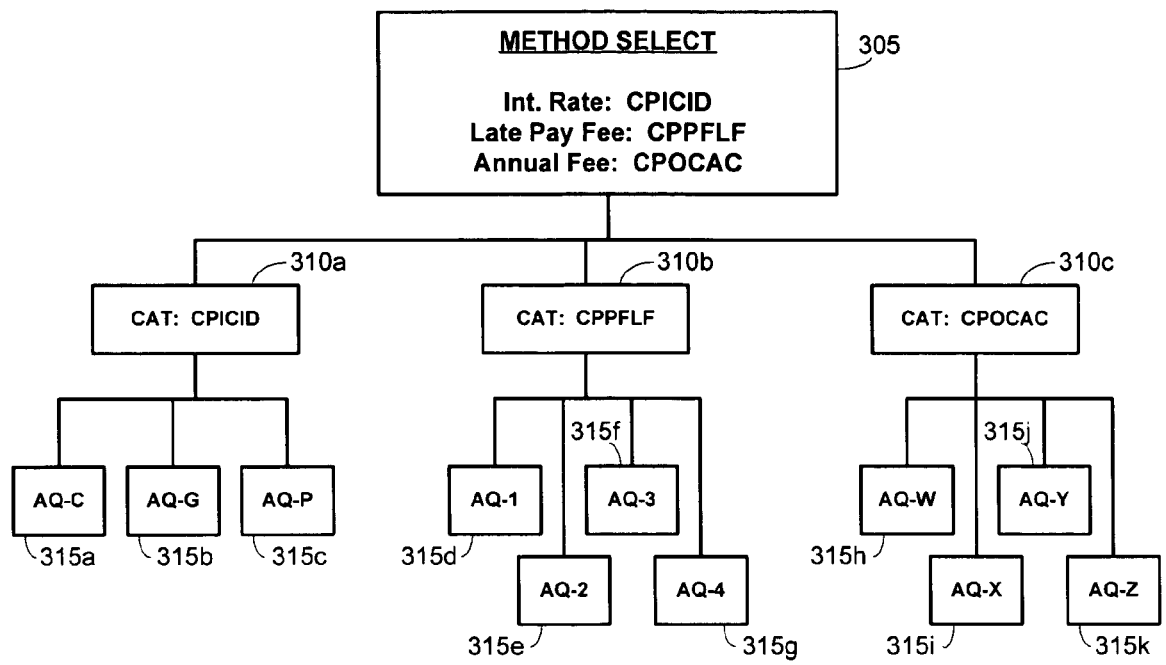
FIGS. 3A and 3B are simplified block diagrams of a hierarchical arrangement of lookup tables implementing decision rules according to exemplary embodiments of the present invention.
Figure 3B:
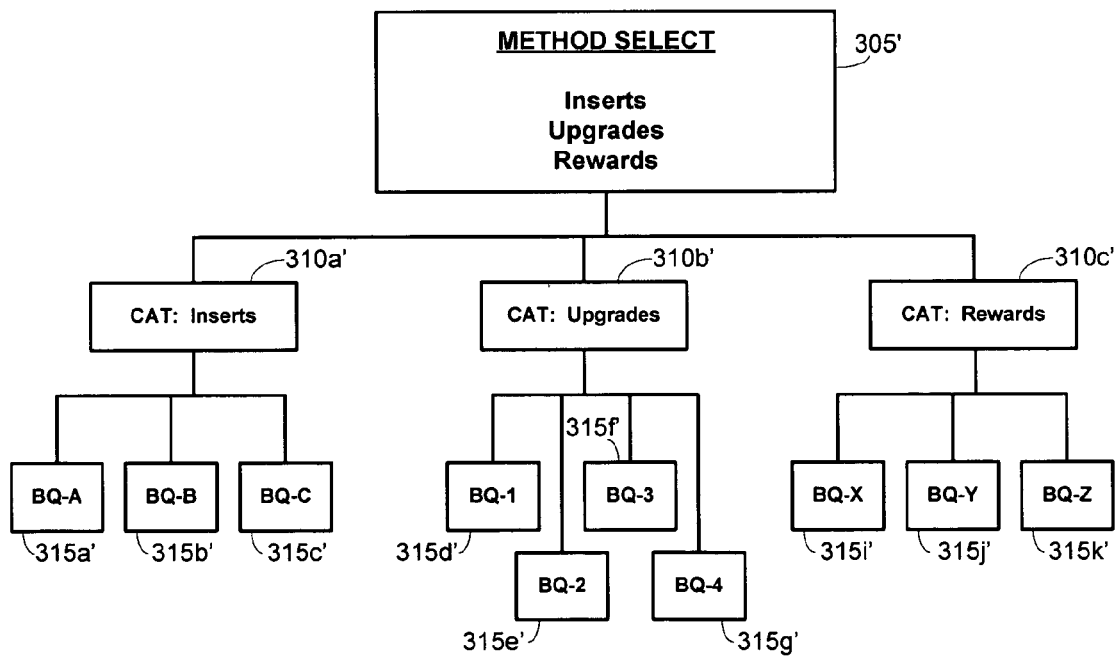
Figure 3C:
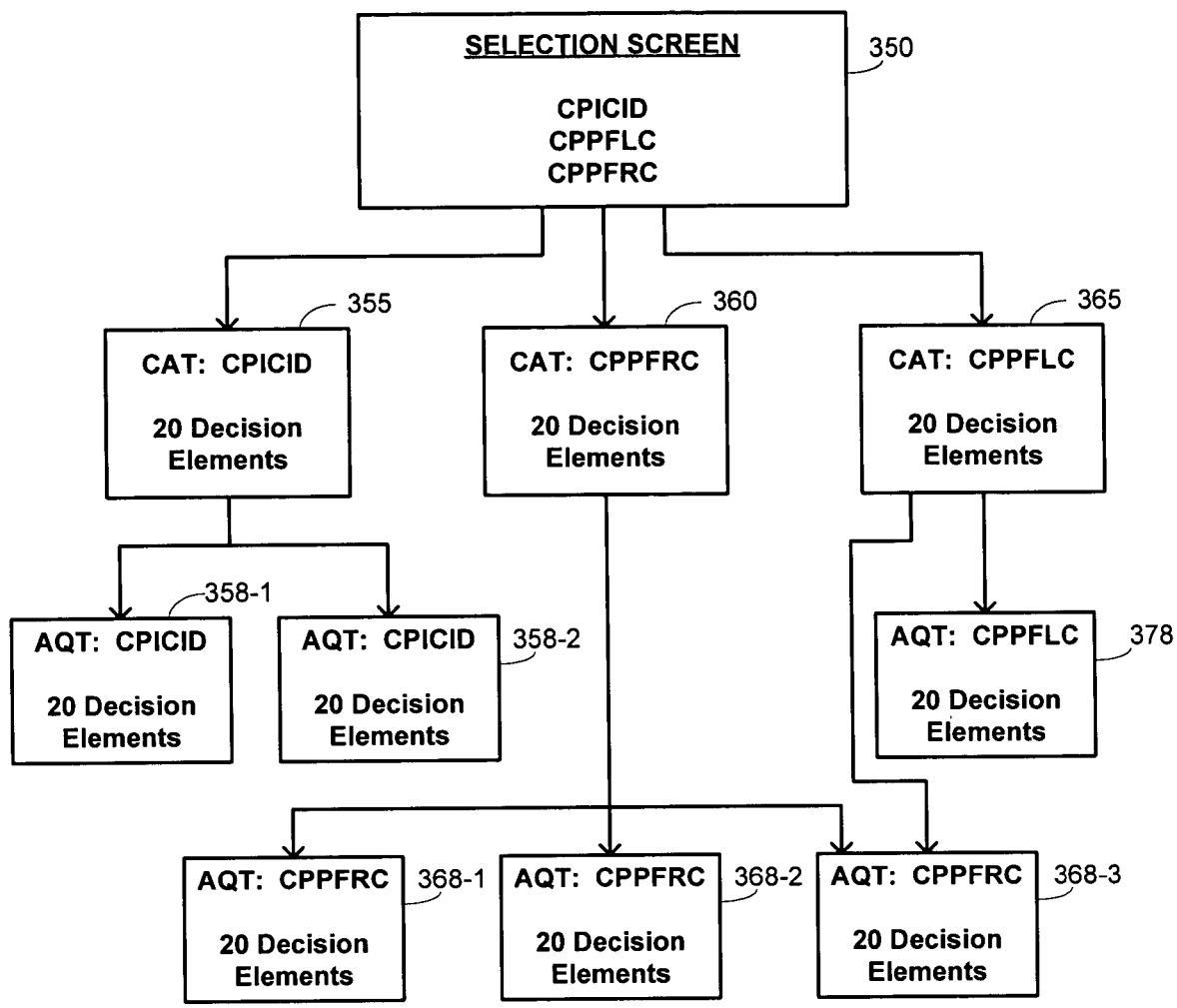
FIG. 3C is a simplified block diagram illustrating the structure of lookup tables in an exemplary embodiment

In one exemplary embodiment, the decision rules stored in rules data store 115 are implemented as a hierarchical arrangement of look-up tables, examples of which are shown in FIGS. 3A and 3B. For illustrative purposes, separate diagrams are provided for fee-related methods in FIG. 3A and non-fee-related methods in FIG. 3B, but it will be understood that such a distinction between method types need not be implemented. Specifically, the methods may alternatively be organized in a single larger hierarchical arrangement. An explicit example is provided in FIG. 3C to illustrate different types of mappings that may be provided between client-allocation tables and account-qualification tables.

a. Decision Rules for Fee-Based Methods

For the fee-related methods shown in FIG. 3A, the top of the hierarchical arrangement is a method selection table 305, in which each overrideable method is listed. The example shown has three overrideable methods (interest rate, late payment fee, and annual fee), but it will be appreciated that any or all of the methods making up a processing strategy may be made overrideable in the same manner as the examples described herein. It will also be appreciated that not all methods are required to be overrideable. For instance, an embodiment of a processing strategy may include 44 methods, of which 27 are overrideable; in that case, the method selection table 305 would have 27 entries.

For each entry in the method selection table 305, there is a corresponding client allocation (CA) table, such as CA tables 310*a*, 310*b*, and 310*c* of FIG. 3A. A table lookup operation on method selection table 305 using a particular overrideable method returns a reference to a corresponding CA table 310*a*, 310*b*, 310*c*. Each CA table performs a first sorting of cardholder accounts based on selected decision elements. FIG. 4A shows an exemplary implementation of a CA table 310*a* for an overrideable interest rate method. In this example, the decision elements are cardholder credit score 405, cardholder income 410, and account age 415. Various thresholds are set in connection with each decision element. For example, cardholder credit score 405 has thresholds at values of "400" and "600"; thus, accounts are grouped by whether the cardholder's credit score is less than "400," between "400" and "600," or greater than "600." With regard to cardholder income 410, accounts are grouped by whether the cardholder's income is under $25,000, between $25,000 and $50,000, or over $50,000. With regard to account age 415, accounts are grouped by whether the account is less than a year old, between one year and three years old, or three or more years old.

Returning to FIG. 3A, one or more account qualification (AQ) tables are associated with each CA table. Thus, AQ tables 315*a*, 315*b*, 315*c* are associated with CA table 310*a*; AQ tables 315*d*, 315*e*, 315*f*, and 315*g* are associated with CA table 310*b*; and AQ tables 315*h*, 315*i*, 315*j*, and 315*k* are associated with CA table 310*c*. A table lookup operation on CA table 310*a* using cardholder data for a particular account returns a reference to one of the associated AQ tables 315*a*, 315*b*, and 315*c*. In FIG. 4, "AQ-C," "AQ-G," and "AQ-P" refer, respectively to AQ tables 315*a*, 315*b*, and 315*c* of FIG. 3. For example, if a cardholder has a credit score of "420," an income of $22,000 and an account age of three years, a table lookup operation on CA table 310*a* (FIG. 4A) would return a reference to table 315*a* of FIG. 3A. The AQ tables provide further sorting of accounts, as will be described below.

It will be appreciated that any number and any combination of decision elements may be included in a CA table such as table 310*a*. In some embodiments, the maximum number of decision elements that a card issuer may select for inclusion in a CA table may be limited (e.g., to 20 decision elements) in order to reduce the potential table size and complexity. Moreover, each CA table 310*a*, 310*b*, 310*c* within a set of decision rules may include different decision elements and different thresholds associated with particular decision elements. A single CA table may include references to any number of AQ tables.

Figure 5A:
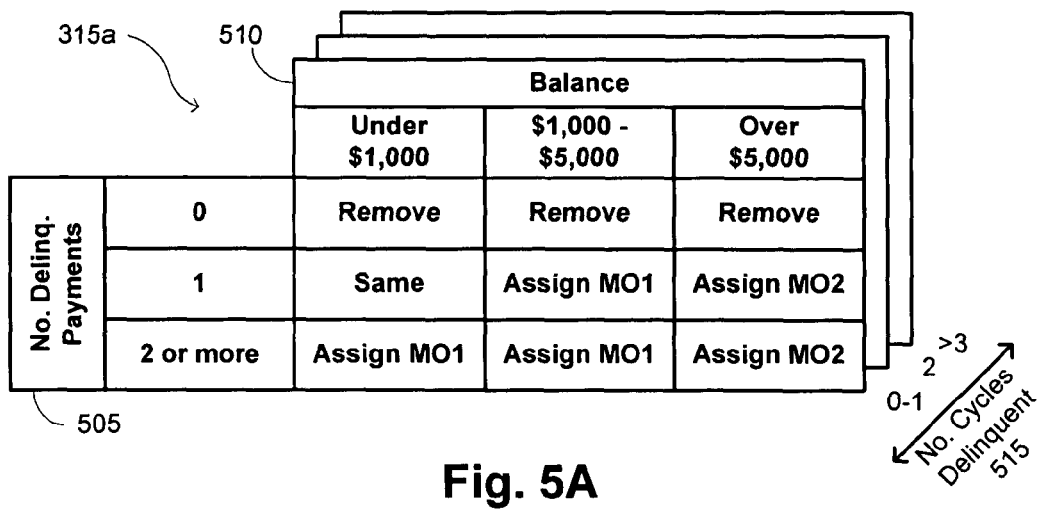
FIGS. 5A-F are tables, each illustrating the contents of an account qualification table according to exemplary embodiments of the present invention.
Figure 5B:
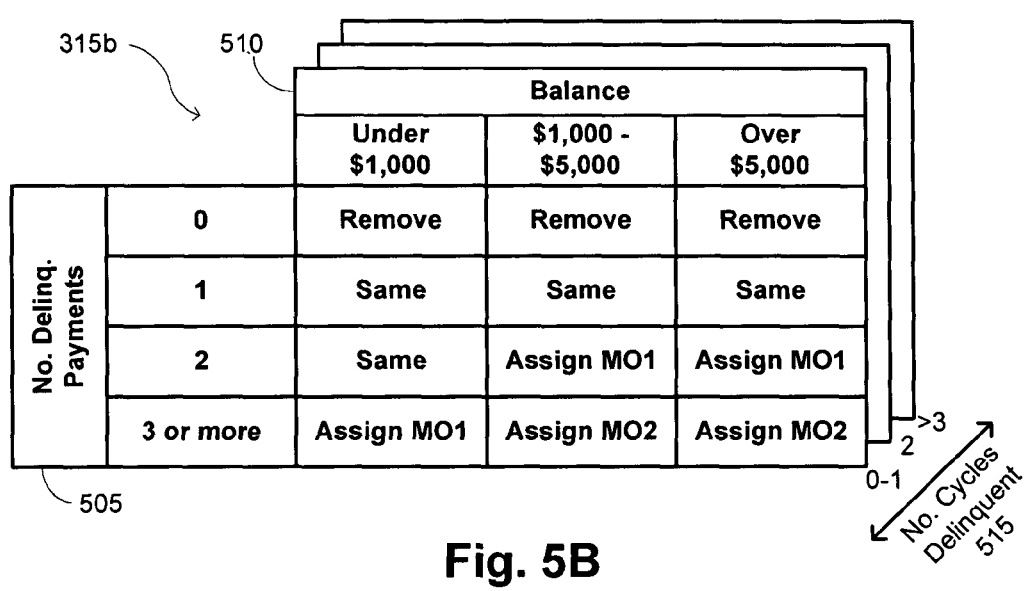
Figure 5C:
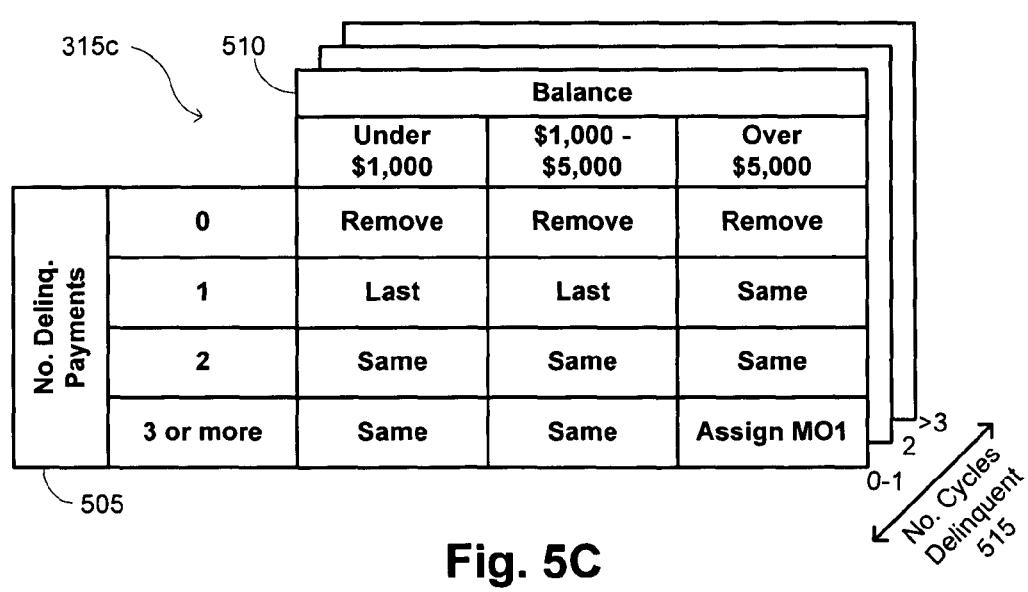

AQ tables 315*a*-315*k* of FIG. 3A provide further sorting of cardholder accounts using additional decision elements. Exemplary implementations of AQ tables 315*a*, 315*b*, 315*c* corresponding to CA table 310*a* are illustrated in FIGS. 5A-C, respectively. AQ table 315*a* is used when a reference to table AQ-C is returned by CA table 310*a* of FIG. 4A; AQ table 315*b* is used when a reference to table AQ-G is returned by CA table 310*a*; and AQ table 315*c* is used when a reference to table AQ-P is returned by CA table 310*a*. In each AQ table 315*a*, 315*b*, 315*c*, three decision elements are used: number of delinquent payments 505, account balance 510, and number of billing cycles a payment is delinquent 515. Again, various thresholds are set in connection with each decision element. For instance, in table 315*a*, the number of delinquent payments 505 is grouped as zero, one, or two or more.

A table lookup operation on an AQ table using cardholder data for a particular account returns a result value that indicates whether a method override is to be applied. In one exemplary embodiment, illustrated in FIGS. 5A-C, each result has one of four possible values—"Assign," "Last Different," "Same," or "Remove." A result of "Assign" indicates that a method override is to be applied to the cardholder account. Where multiple method overrides are available for a particular method, the "Assign" result includes an identifier of the method override to be applied. For instance, in FIGS. 5A-C, each "Assign" result includes either identifier "MO1" or identifier "MO2." In this example, identifier "MO1" identifies a first method override that changes the interest rate to 18%, and identifier "MO2" identifies a second method override that changes the interest rate to 21%. In some alternative embodiments, a result value of "Assign" is indicated by returning only the method override identifier. A result of "Last Different" indicates that a formerly applied method override is to be reapplied to the cardholder account, as described further below. A result of "Same" indicates that the status of the account is unchanged—i.e., a current method override (if present) is to remain in effect but no new method override is to be applied. A result of "Remove" indicates that the current method override is to be taken off the account, restoring the default method.

b. Decision Rules for Non-Fee-Based Methods

The non-fee-based methods may be overridden by similar decision rules, illustrated for a specific embodiment in FIG. 3B. In this figure, the top of the hierarchical arrangement of look-up tables comprises a method selection table 305', in which each overrideable method is listed. The example illustrates non-fee-based overrideable methods related to inserts, upgrades, and rewards. In particular, the "inserts" method is directed to determining which inserts may be included with an issued statement regarding the financial account. The ability to override the insert method according to different override assignments permits inserts to be included with statements on a completely individualized basis. When the server has determined how inserts are to be included according to the overrides, a file may be provided through output device that may be used by an intelligent insertion system, such as the one described in detail in copending, commonly assigned U.S. patent application Ser. No. 10/028,449, entitled "REAL-TIME INTELLIGENT PACKET-COLLATION SYSTEMS AND METHODS," filed Dec. 19, 2001 by Scott J. Smith et al., the entire disclosure of which is herein incorporated by reference.

The "upgrades" method is directed to determining whether to offer an upgrade in processing strategy to the account holder. For example, in cases where the account comprises a credit-card account, the upgrades method may define criteria by which the cardholder may be offered a higher-status card on a preapproved basis. The holder of a classic card might be offered an upgrade to a gold card, or the holder of a gold card might be offered an upgrade to a platinum card, depending on such factors as the length of time the individual has been a customer and his payment record. Embodiments of the invention permit the usual method of determining whether to offer an upgrade to be overridden in response to specific account parameter values and account usage information. For example, if a cardholder achieves a particular increase in credit score and maintains a balance within a predefined window, the upgrade method may be overridden to accelerate an upgrade offer. In another embodiment, the default strategy may be never to offer an upgrade. This default strategy may be overridden to offer upgrades upon satisfaction of certain criteria, enabling upgrades to be offered on an individualized basis.

The "rewards" method is directed to determining whether to offer a reward to the account holder. In some embodiments, this may be implemented similarly to the upgrades method by adopting a default strategy never to provide a reward. Upon the satisfaction of certain criteria, this default strategy may be overridden to provide rewards on an individualized basis. In other embodiments, the rewards method may use a default strategy that provides rewards when certain criteria are satisfied. This default strategy may be overridden in accordance with account parameter values and account usage information, such as by enhancing the quality of the reward or by providing lesser awards. In some instances where the account information is generally negative, the override may act to suppress rewards that would otherwise be offered in accordance with the rewards method. Rewards may take a variety of different forms, such as by providing points or coupons, and the rate at which these are provided may be overridden with embodiments of the invention.

Embodiments of the invention also permit rewards to be tied directly to certain types of transactions. For example, in one embodiment, an extended grace period may be provided for certain types of charitable contributions. If such a charitable contribution is made by charging the financial account, the invention permits the processing strategy to be overridden with respect to that transaction so that the time for repayment without a finance charge is extended.

For each entry in the method selection table 305', there is a corresponding client allocation table, such as tables 310*a'*, 310*b'*, and 310*c'* of FIG. 3B. Similarly to the fee-based overrideable methods, the respective client allocation tables are used to perform a first sorting of accounts based on selected decision elements. This first sorting identifies one of a plurality of account qualification tables (identified as "BQ" tables for the non-fee-based methods). For example, in FIG. 3B, account qualification tables 315*a'*, 315*b'*, and 315*c'* are associated with the client allocation table 310*a'* for the inserts methods; account qualification tables 315*d'*, 315*e'*, 315*f'*, and 315*g'* are associated with the client allocation table 310*b'* for the upgrades methods; and account qualification tables 315*i'*, 315*j'*, and 315*k'* are associated with the client allocation table 310*c'* for the rewards methods.

FIG. 4B provides an exemplary implementation of client allocation table 310*c'* for the rewards methods. This example illustrates an implementation of the override scheme that may permit an extended grace period for repayment of charges made for charitable donations. The decision elements comprise cardholder credit score 420 and the type of transaction 425, i.e. whether the transaction is classified as a charitable or noncharitable transaction. Thresholds are set in connection with the cardholder credit score 420 so that those with a larger credit score are more likely to be permitted to use the extended grace period than those with a lower credit score. In this example, the cardholders with the very lowest credit scores are not extended any benefit from the charitable nature of the transaction; this is evident from the fact that the client allocation table 310*c'* identifies the same account qualification table BQ-X 315*i'* for the lowest credit scores as it does for all noncharitable transactions.

Figure 5D:
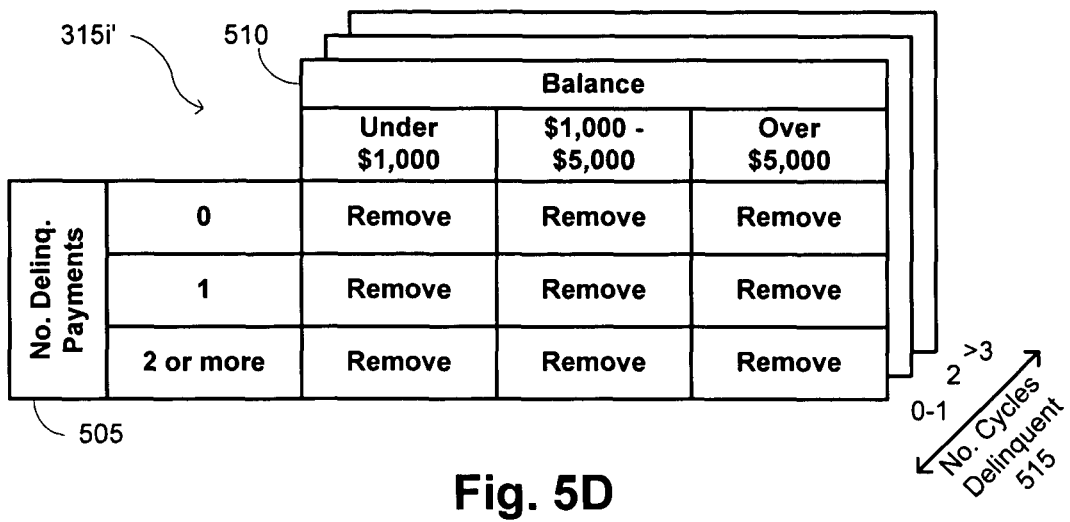

Details of this account qualification table BQ-X 315*i'* are provided in FIG. 5D. Like the fee-based account qualification tables AQ, the non-fee-based account qualification tables BQ are illustrated herein with three decision elements, the number of delinquent payments 505, the account balance 510, and the number of billing cycles that a payment is delinquent 515. In the case of account qualification table BQ-X 315*i'*, all of the entries are "Remove," indicating that the default method is to be applied in all cases. This has the effect of ensuring that no extended grace periods are provided for charges related to noncharitable expenses nor for those with the lowest credit scores.

Figure 5E:
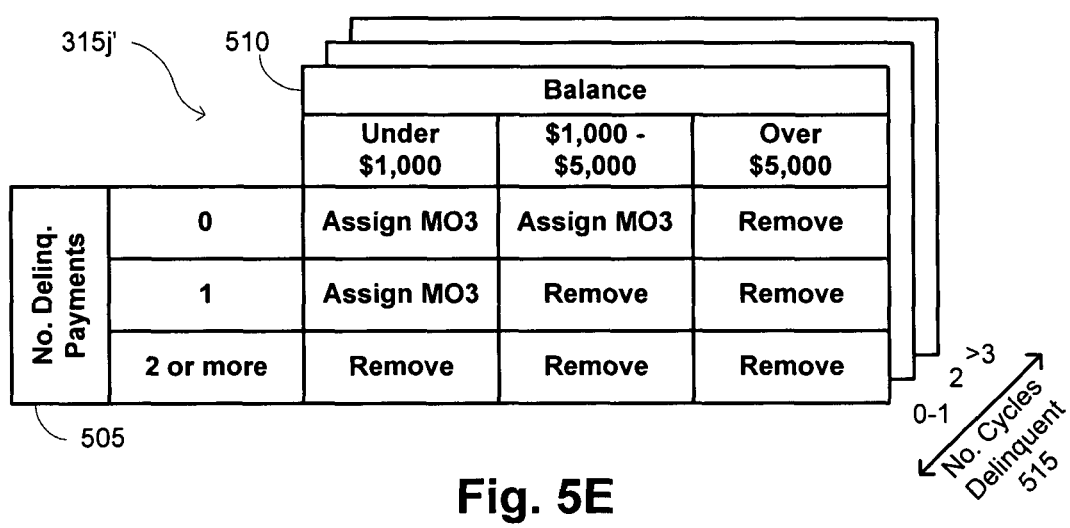

If the credit scores for the cardholder are mediocre, client allocation table 310*c'* indicates that a method override for charitable transactions will be considered as set forth in account qualification table BQ-Y 315*j'*. An example of this account qualification table is shown in FIG. 5E and uses a combination of "Remove" and "Assign M03" designations. The "Assign M03" designations correspond to a method override, such as providing a one-month grace period for the relevant transaction. In this example, the "Remove" designations are more prevalent with increases in account balance 510 and with the number of delinquent payments 505. This causes the extended grace period to be provided only where the cardholder has a relatively low balance and relatively few delinquent payments.

Figure 5F:
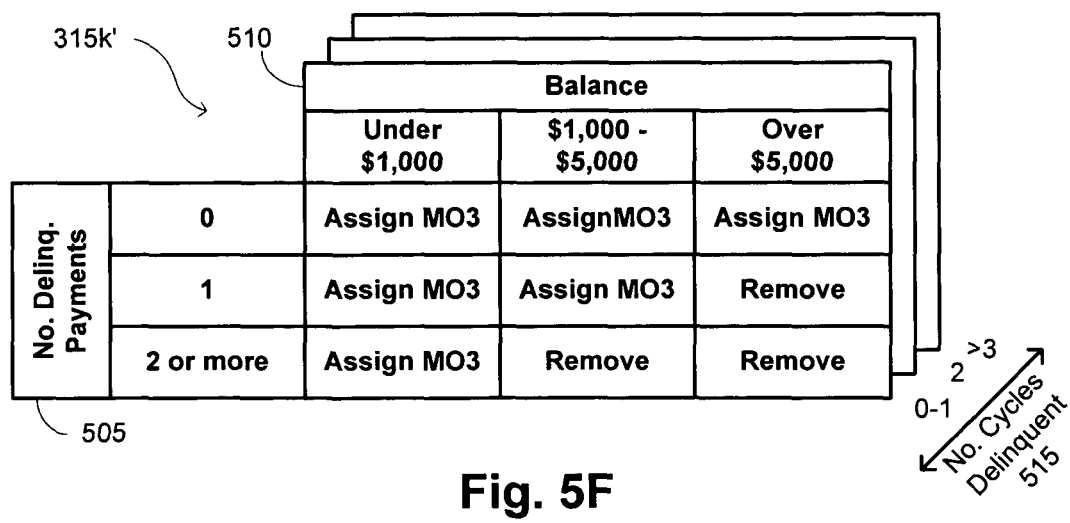

When the credit scores of the cardholder are high, client allocation table 310*c'* indicates that the method override for charitable transactions will be considered as set forth in account qualification table BQ-Z 315*k'*. An example of this account qualification table is shown in FIG. 5F and differs from the one shown in FIG. 5E in the distribution of the "Remove" and "Assign M03" designations. This different distribution reflects the fact that an extended grace period for charitable contributions may be provided for despite somewhat larger account balances 510 or number of delinquent payments 505 if the cardholder has a high credit score.

It will be appreciated that the AQ and BQ account qualification tables of FIGS. 5A-F are illustrative and that variations and modifications are possible. For instance, any number of decision elements may be included in each account qualification table. In some embodiments, the maximum number of decision elements that a card issuer may select for inclusion in an account qualification table may be limited (e.g., to 20) in order to reduce the potential size and complexity of the tables. In the exemplary tables shown in FIGS. 4A, 4B, and 5A-5F, the set of decision elements included in the account qualification tables of FIGS. 5A-5F is disjoint from the set of decision elements included in the client allocation tables of FIGS. 4A and 4B, but this is not required. It will also be appreciated that each of account qualification tables may employ different decision elements, different numbers of decision elements, and/or different threshold values associated with particular decision elements. In addition, the result values described herein for an account qualification table lookup operation are illustrative, and a person of ordinary skill in the art will recognize that other result values or other combinations of result values may be implemented.

In some alternative embodiments, account sorting is performed exclusively with account qualification tables. Such an embodiment may be implemented by configuring each CA table to be a transparent pass-through that always returns the same account qualification table reference. For instance, in FIG. 3A, table 310*c* may be configured to return a reference to AQ-W table 315*h* for all cardholders. One skilled in the art will recognize that implementations with a nontransparent CA table such as table 310*a* provide additional flexibility. For instance, CA table 310*a* may be used to sort account holders based on the processing strategy assigned to the account—e.g., "classic," "gold," or "platinum"—by returning a reference to AQ-C table 315*a* for "classic" cardholders, to AQ-G table 315*b* for "gold" cardholders, and to AQ-P table 315*c* for "platinum" cardholders. Because each AQ table may establish different decision rules for applying a method override, it is possible for a card issuer to implement multiple processing strategies where each processing strategy has different default methods and different method overrides, as well as different conditions for applying the method overrides.

In other embodiments, additional levels of account sorting tables may be included between the CA tables and the account qualification tables to provide further account classification. One of ordinary skill in the art will recognize that the additional levels may be implemented by providing a hierarchy of levels of lookup tables, with tables at each level returning references to tables at the next level. For instance, a CA table lookup may return a reference to a table at an intermediate level, and a lookup in a table at the intermediate level may return a reference to an account qualification table.

c. Example

Embodiments of the invention may accommodate a variety of different types of mappings between the client-allocation tables and account-qualification tables. One illustration of some of the different types of mappings is provided with the example of FIG. 3C. In this example, a selection screen may map to a plurality of different client-allocation tables, shown for the example to be the CPICID (interest defaults), CPPFLC (late charges), and CPPFRC (returned check charges) method overrides. A client-allocation table is provided for each of these method overrides, namely CA table CPICID 355 for interest defaults, CA table CPPFRC 360 for returned check charges, and CA table CPPFLC 365 for late charges.

As indicated, each client-allocation table may include multiple decision elements and may map to one or more account qualification tables, each of which may also include multiple decision elements. Thus, in the example, CA table CPICID 355 may map to two AQ tables 358-1 and/or 358-2. Similarly, CA table CPPFRC 360 may map to three AQ table 368-1, 368-2, and/or 368-3. In addition to mapping to AQ table 378, CA table CPPFLC 365 may map to AQ table 368-3. In this way, different embodiments of the invention may encompass one-to-many mappings (of which CA table 355 to AQ tables 358-1 and 358-2 is an example), many-to-one mappings (of which CA tables 360 and 365 to AQ table 368-3 provide an example), and many-to-many mappings, in addition to simple one-to-one mappings. The availability of such variations in mapping possibilities permits increased flexibility in the way method overrides may be implemented.

Table 1 provides a summary of some exemplary method overrides that may be applied in different embodiments. The combinations of one-to-one, many-to-one, one-to-many, and many-to-many mappings among corresponding method-override tables may be used in different embodiments

TABLE 1

Examples of Method Overrides

| | |
|---|---|
| CPICBP | Incentive Pricing Breakpoints |
| CPICIB | Incentive Pricing Break Points |
| CPICID | Interest Defaults |
| CPICII | Interest on Interest |
| CPICIM | Interest Methods |

TABLE 1-continued

Examples of Method Overrides

| | |
|---|---|
| CPICIP | Incentive Pricing |
| CPICIV | Incentive Pricing Variable Interest |
| CPICMF | Minimum Finance Charges |
| CPICPE | Payoff Exception |
| CPICSP | Statement Production |
| CPICSZ | Securitization Controls |
| CPICVI | Variable Interest |
| CPIOAC | Annual Charges |
| CPIOCI | Cash Advance Item Charges |
| CPIOMC | Miscellaneous Charges |
| CPIOMI | Merchandise Item Charges |
| CPIOSC | Statement Charges |
| CPOCDR | Debit Ratification |
| CPOCMP | MULTRAN Processing |
| CPOCSD | Statement Design |
| CPPFDA | Declined Authorization Charges |
| CPPFLC | Late Charges |
| CPPFOC | Overlimit Charges |
| CPPFRC | Returned Check Charges |
| CPPOCA | Credit Application |
| CPPOMP | Minimum Payment Due |
| CPPOSP | Skip Payment |

The table identifies different types of charges, pricing schemes, and the like that may be applied in account processing, each of which may be overridden in isolation or in combination in accordance with the method-level processing described herein. A number of specific illustrations follow.

4. Illustrations

Figure 6A:
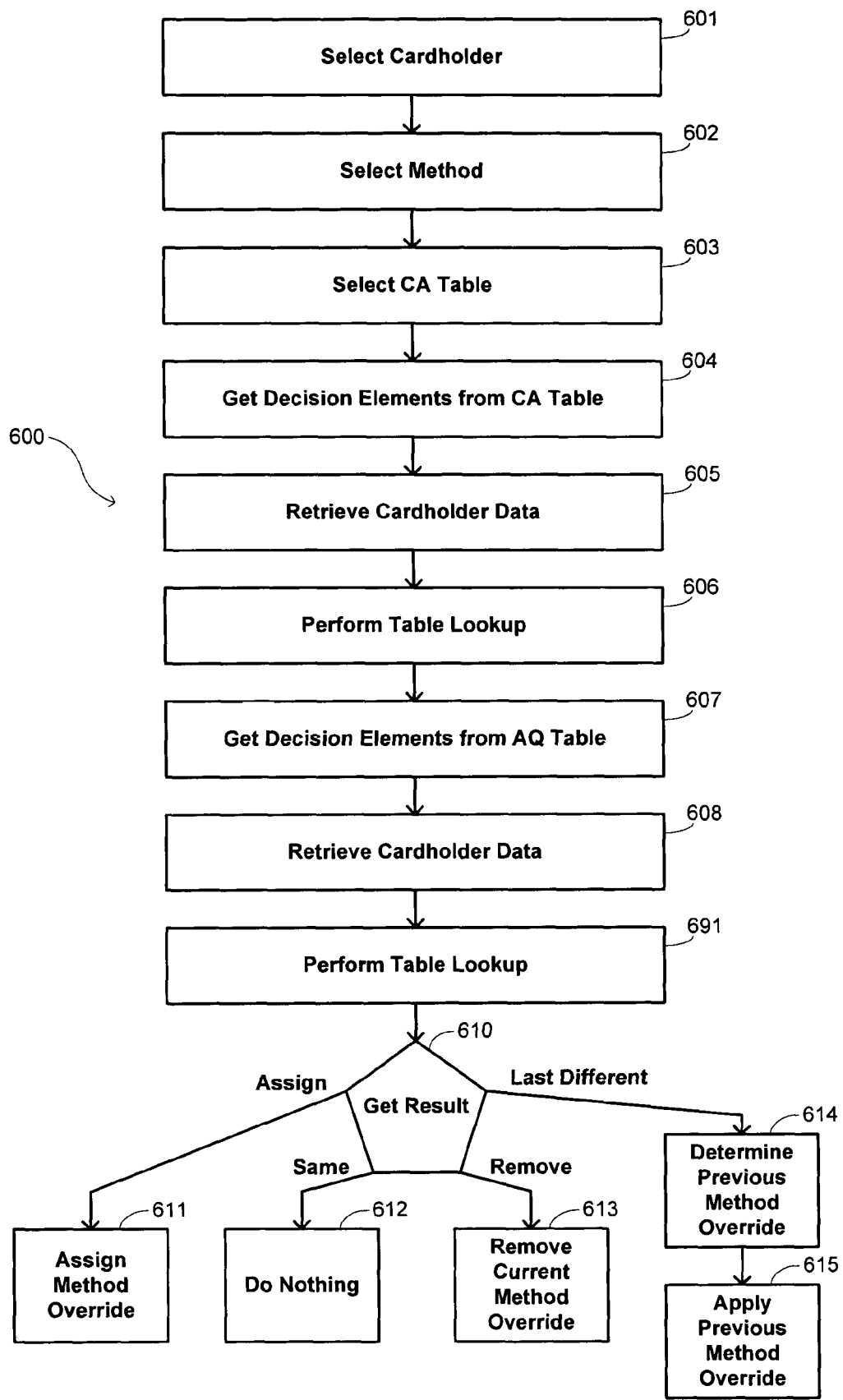
FIG. 6A is a flow chart of an exemplary process for applying a method override to a cardholder account according to the present invention.

FIG. 6A is a flow chart of an exemplary process 600 for applying method overrides to cardholder accounts. Process 600 may be executed by decision engine 125 of FIG. 1A. Process 600 involves accessing an account record 200 from account data store 110-1, then performing table lookup operations using look-up tables from rules data store 110-2 and account data from the account record 200 to determine whether a method override is to be applied to the account. For purposes of illustrating process 600, the exemplary CA table 310a of FIG. 4A and the exemplary AQ tables 315a, 315b, 315c of FIGS. 5A-C will be referred to herein; it will be appreciated that other tables may be substituted. In addition, it will be presumed for illustrative purposes that account data store 110 includes account records for hypothetical cardholders X, Y, and Z, and that each of these account records includes the respective data shown in Table 2. The various entries in Table 2 will be described further below. It will be appreciated that records for other cardholders may also be included in account data store 110-1 and that an account record may include other data not shown in Table 2.

TABLE 2

| | Cardholder X | Cardholder Y | Cardholder Z |
|---|---|---|---|
| Processing Strategy | Classic | Gold | Platinum |
| Current Int. Rate Method Override | none | MO2 | none |
| Last Different Int. Rate override | none | MO1 | MO2 |
| Credit score | 420 | 550 | 777 |
| Income | $22,000 | $35,000 | $80,000 |
| Account age | 3 years | 4 years | 3 years |
| No. Delinquencies | 1 | 0 | 1 |
| Average Balance | $1,500 | $500 | $2,500 |
| No. Cycles Delinquent | 1 | 0 | 1 |
| Transaction Type | Charitable | Noncharitable | Charitable |

Referring to FIG. 6A, at step 601 an account record is selected. For instance, decision engine 125 may be configured to select each account record sequentially. Alternatively, an operator may select an account record or a set of account records via user interface 120. At step 602, one of the overrideable methods is selected. For example, the overrideable interest rate method may be selected. Method selection may be performed automatically by decision engine 125 (e.g., by cycling through all overrideable methods for each cardholder account) or manually by an operator via user interface 120. Next, at step 603, the decision engine 125 selects the appropriate CA table by performing a table lookup in the method selection table (e.g., table 305 of FIG. 3A) using the method selected at step 602. The table lookup returns a reference to a CA table; for instance, a table lookup in table 305 using the interest rate method returns a reference to CA table 310a.

At step 604, the decision engine identifies the decision elements used in the selected CA table. In CA table 310a of FIG. 4A, the decision elements are credit score 405, cardholder income 410, and account age 415. At step 605, the decision engine 125 retrieves the corresponding account data from the account record. For instance, for cardholder X, the decision engine 125 would retrieve a credit score of 420, an income of $22,000, and an account age of three years. For cardholder Y, the decision engine 125 would retrieve a credit score of 550, an income of $35,000, and an account age of four years. For cardholder Z, the decision engine 125 would retrieve a credit score of 777, an income of $80,000, and an account age of four years.

It will be appreciated that a decision element need not correspond exactly to a field in the account record 200. For instance, the account record 200 may include the opening date of the account, which is constant, rather than the account age, which would require periodic updating. If the opening date is stored, the account age may be readily computed based on the opening date and the current date. Thus, step 605 may include performing computations to convert data in the account record 200 to a format corresponding to the decision element.

At step 606, the decision engine 125 selects the appropriate account qualification table by performing a table lookup in the selected CA table 310a using the cardholder data. The lookup returns a reference to an account qualification table. For instance, a table lookup in CA table 310a (FIG. 4A) using the characteristics given in Table 1 for cardholder X would return a reference to the AQ-C table (table 315a of FIG. 5A); for cardholder Y, a reference to the AQ-G table (table 315b of FIG. 5B); and for cardholder Z, a reference to the AQ-P table (table 315c of FIG. 5C).

At step 607, the decision engine 125 identifies the decision elements used in the selected AQ table. For instance, in table 315a in FIG. 5A, the decision elements are number of delinquent payments 505, account balance 510, and number of cycles delinquent 515. At step 608, the decision engine retrieves the corresponding data for the cardholder account. This step is generally similar to step 605 and may include converting data in the account record to a format corresponding to the decision element. In an alternative embodiment, the corresponding account data have already been retrieved at step 605, and step 608 may be skipped.

At step 609, the decision engine 125 performs a table lookup in the selected account qualification table using the account data, and the lookup returns a result. For example, for cardholder X of Table 1, a result of "Assign MO1" would be obtained from AQ-C table 315a; for cardholder Y, a result of "Remove" would be obtained from AQ-G table 315b; and for cardholder Z, a result of "Last Different" would be obtained from AQ-P table 315c. It should be noted that the result for a particular cardholder may depend in part on which account qualification table was selected at step 606. For instance, Table 1 shows that each of cardholders X and Z has one late payment, a balance between $1,000 and $5,000, and a payment one cycle delinquent. But because these two cardholders would be referred to different AQ tables (based on other characteristics), cardholder X would receive a result of "Assign MO1" while cardholder Z would receive a result of "Last Different."

At step 610, the decision engine 125 acts upon the result. If the result is "Assign," then at step 611 the method override associated with the "Assign" result is applied to the cardholder account. For example, cardholder X would have the "MO1" override applied, meaning that cardholder X's interest rate would be changed to 18%. The mechanism for applying a method override depends on the implementation of an account record. For instance, in one embodiment, the account record includes fields for storing method override identifiers, and a method override is applied to an account by modifying one of these fields. In an alternative embodiment, a list of all method overrides currently applied to the account is maintained in the account record or in an associated file; in this embodiment, step 611 includes adding the newly applied method override to the list.

If the result is "Same," then at step 612, the account record is left unchanged, i.e., no new method override is applied, while any currently applied method override remains applied.

If the result is "Remove," then at step 613, it is determined whether a method override corresponding to the method selected at step 602 is currently applied to the cardholder's account. If so, then the method override is removed. For example, Table 1 shows that cardholder Y currently has a method override "MO1" applied. The "Remove" result obtained for cardholder Y would cause this method override to be removed at step 613, restoring the default interest rate parameter. Removal of a method override is implementation-dependent and may involve, for instance, modifying an appropriate field in the account record or removing the method override from a list of method overrides currently applied to the account. Upon removal, processing history information in the account record may be updated accordingly.

If the result is "Last Different," then at step 614, a formerly applied method override is determined. In an exemplary embodiment, information related to method overrides that were previously applied to and removed from an account is stored in a method override history file associated with the account record, and step 614 includes retrieving the identifier of the most recent formerly applied method override from the method override history file. At step 615, the method override identified at step 614 is applied to the cardholder account. For example, for cardholder Z, a result of "Last Different" would be obtained. At step 614, the account record for cardholder Z would be accessed to determine the last method override for interest rate that was applied; Table 1 shows that for cardholder Z, the last method override was "MO2." Then, at step 614, method override "MO2" would be applied to cardholder Z's account, changing the interest rate parameter (currently set by the default method) to 21%.

While the above illustration has been discussed in some detail for a fee-based method, it will be appreciated that the same procedure may be used for any of the methods, including the non-fee-based methods. For example, Table 2 also indicates a specific transaction type for consideration for each of the cardholders. Using the method outlined in FIG. 6A, a determination would be made for each cardholder whether to provide an extended grace period for that transaction. In accordance with blocks 602 and 603, the CA table used for the rewards methods is table 310$c'$ shown in FIG. 4B. According to table 310$c'$, the override determination for Customer X is made in accordance with account qualification table BQ-Y 315$j'$ shown in FIG. 5E, which provides the result "Remove" according to the midrange account balance of $1500 and the midrange single delinquency. This determination indicates that no override should be applied so payment for the transaction is due in accordance with the default method despite it having been made for a charitable purpose. Similarly, the determination for Customer Y is made in accordance with account qualification table BQ-X 315$i'$ shown in FIG. 5D, which provides the result "Remove" irrespective of account balance and number of delinquencies. This determination indicates that no override should be applied so that payment for the transaction is due in accordance with the default transaction; this is a consequence of the fact that the transaction was made for a noncharitable purpose. Finally, the determination for Customer Z is made in accordance with account qualification table BQ-Z 315$k'$ shown in FIG. 5F. Despite the midrange account balance of $2500 and midrange single delinquency, similar to Customer X, the higher credit rating of Customer Z results in a determination of "Assign M03." In accordance with this determination, an extended grace period is provided for the charitable transaction made for Customer Z.

Some embodiments of the invention may implement lock states and/or unique result identifiers. Both of these functions provide different types of control over subsequent changes in the method overrides. For example, the unique result identifiers allow the status of an account to be monitored and for an applied method-override automatically to be removed upon the satisfaction of certain conditions; when the conditions occur, the processing of the account reverts back to its processing before application of the method override. The application of the lock function may prevent such reversion, even upon the occurrence of the conditions, allowing the override to be marketed as "guaranteed" for a specified period of time or indefinitely.

Figure 6B:
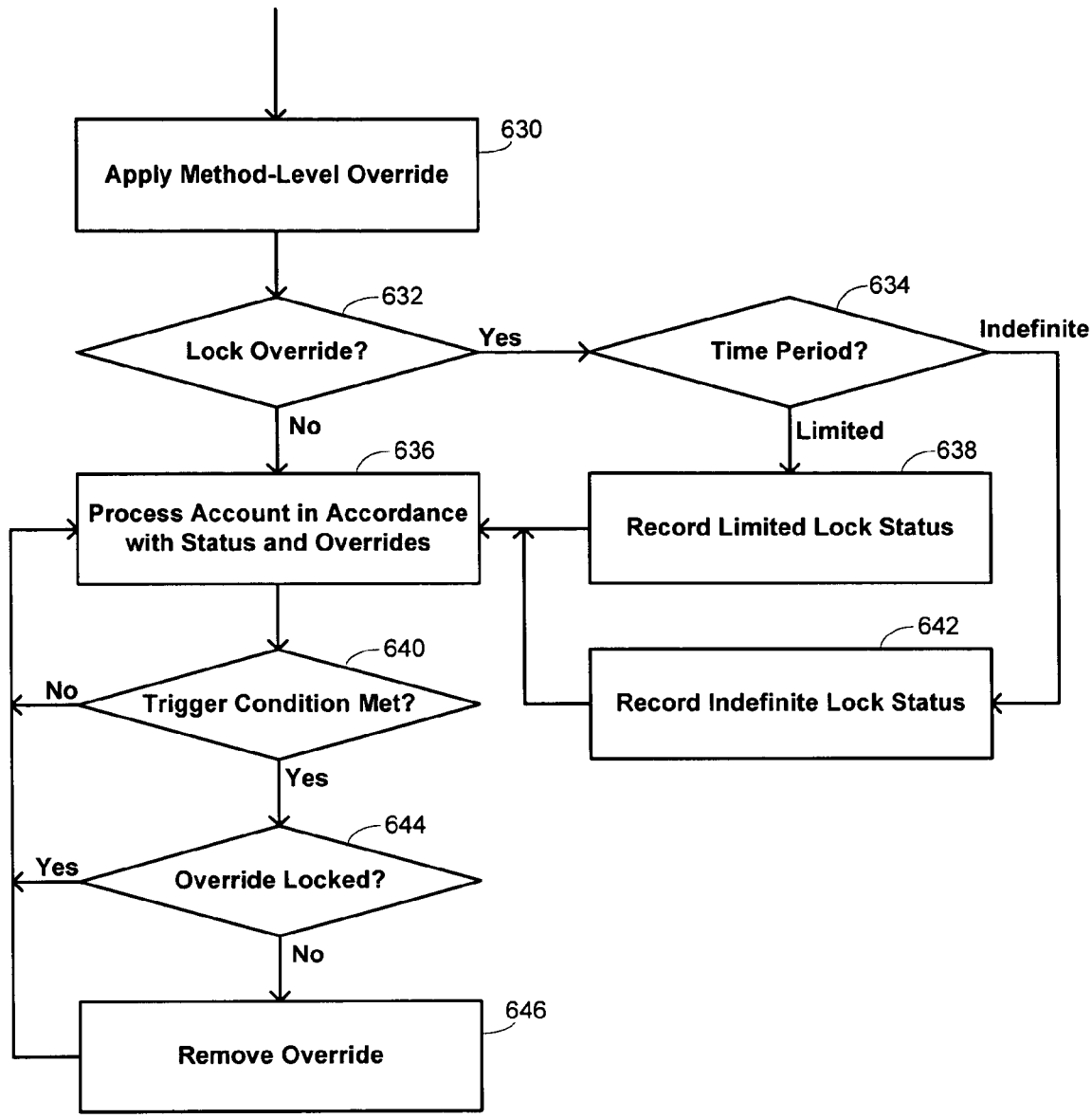
FIG. 6B is a flow chart illustrating the implementation of unique-result identifiers and of lock flags in different embodiments.

A summary of the application of such states is illustrated with FIG. 6B, in which a method-level override has been applied as described above at block 630. At block 632, a determination is made whether the override is to be locked. If so, the time period for the lock may be for a limited time, such as for three months or six months, particularly if the method override is applied as part of a promotional program, or may be indefinite. If, as checked at block 634, the time period is to be limited, the limited lock status is recorded at block 638 with a indication when the lock is to expire. Conversely, if the time period is to be indefinite, the lock status is recorded at block 642 with an indication that it is to be maintained indefinitely. In cases where the lock is for an indefinite period, it may still generally possible for the override to be removed, but such removal may require higher level of intervention than is possible through normal processing. This is also generally true of the limited-time overrides, which may be locked to prevent their removal during normal processing but which may still be subject to greater levels of intervention that permit removal of the override in unusual circumstances.

Once the application of any locks to the override have been recorded, the system generally permits the account to be processed in accordance with its status and with any applicable overrides at block 636. For example, funds may be extended on credit from the account up to a specified limit, finance charges may be computed based on balances outstanding greater than some period of time, the finance changes may be computed at a particular interest rate, etc. Each of these characteristics may be specified by an original contract that has been modified through the application of one or more overrides. In many instances, the particular application of these characteristics may depend on the status of the account, such as by providing a higher interest rate to accounts having higher risk factors and modifying the interest rate in response to changes in the risk factors.

In some instances, the application of the override may automatically be reconsidered by the system in response to the occurrence of a trigger condition. The system accordingly checks at block 640 for the occurrence of the trigger condition, continuing simply to process the account in accordance with its status and applicable overrides if the trigger condition does not occur. Satisfaction of the trigger condition generally indicates that a particular override is to be removed. A check is accordingly made at block 644 whether that override has a locked status. If so, the override is maintained despite the occurrence of the trigger condition, but may be removed as soon as the time period for a limited-time lock passes. If the override is not locked, it is removed in response to the trigger condition being met at block 646.

Merely by way of illustration, a number of examples are noted to illustrate the application of method-level overrides and locks. For instance, the system may maintain historical information on applicable pricing strategies to which the system reverts for individual accounts if certain triggers are met. Suppose a delinquent account has its interest rate raised to 29% by a method-level override, without any lock being placed on the override. A trigger condition may specify that the override is to be removed if payments are made for the account on time for six months, in which case the customer will find that the interest rate is automatically lowered to its original rate by making timely payments. If the customer continues to make timely payments, a further method override might be applied to reduce the interest rate to 9.9% to reward the positive behavior, with a trigger condition specifying that the override be removed in the event the account again becomes delinquent. In this way, the customer automatically loses the benefit when the positive behavior stops.

The method-level overrides may be locked for a number of different reasons. For example, a decision may be made to provide a time-limited locked override in response to a threat by a customer to close an account. This allows, for instance, the customer to be provided with a guaranteed lower interest rate in exchange for not closing the account. Overrides may also be locked in for accounts maintained on behalf of deployed military personnel so that account characteristics do not change during the period of their deployment. In some cases, the locked override may be reinitiated at the end of a limited-time period if the customer is still deployed One skilled in the art will also recognize that process 600 may be varied or modified, and that steps may be omitted, reordered, or combined. For instance, method selection may precede selection of a cardholder account. Process 600 may also be modified to apply decision rules implemented using tools other than lookup tables.

As noted above, decision engine 125 of FIG. 1A may have a number of operating modes. These operating modes may be implemented using process 600 or variations thereof. For instance, in one operating mode, decision engine 125 may be used to determine the terms and conditions applicable to a prospective account. In this operation, a process similar to process 600 may be used. At step 601, cardholder data for a prospective cardholder may be obtained via user interface 120; and at step 610, instead of updating an account record, a statement including terms and conditions for the prospective account may be generated and presented via user interface 120 or via other methods, such as printing an offer for mailing to the prospective cardholder.

5. User Interface

Access to method override information for individual cardholder accounts may be made available via user interface 120. For example, in one embodiment, an operator (e.g., a customer service representative of the card issuer) enters a cardholder account number and requests method override data for that account. Server 105 accesses account data store 110, retrieves the account record 200, and displays the method override information to the operator.

FIG. 7A shows an example of a Cardholder Method Override (CMO) screen 700 that may be used to present method override information for a particular cardholder (John Doe). CMO screen 700 shows information including a list 705 of method overrides that are currently applied to the cardholder's account. In this example, each method for which a method override has been applied to the account is identified by a first code, e.g., "CP IC IM." The method override is identified by a second code, e.g., "BA0022." The operator may select one of the methods (e.g., "CP IC IM"), for instance by navigating a cursor to the code name of the method on screen 700 and then pressing "S" to select the method. Upon selection of a method, an Audit History screen 750, shown in FIG. 7B, is displayed.

Audit History screen 750 displays additional details related to the "CP IC IM" method override on the cardholder's account. Audit history screen 750 displays information such as when the current method override was applied to the account (transaction date 760), the last method override that was applied for the method (the "Last Different" value 765), and the decision element(s) 770 that caused the current method override to be applied. Display screens such as screens 700, 750 may be used, for instance, when a cardholder contacts the card issuer's customer service center with a question about why some aspect of the cardholder's account processing has changed. The customer service operator reviews information on screens 700, 750 to determine the answer and relays the information to the cardholder. It will be appreciated that screens 700, 750 are illustrative and that other formats may be used to provide method override information for a particular account. In one alternative embodiment, complete account history data is provided to a user, and the user is able to design customized display screens for reviewing the data.

FIGS. 8A-8C illustrate further aspects of a customer service interface that provide audit capabilities to a customer-service representative. In this instance, the CMO screen 800 shows information for cardholder John Test, with a list of method overrides that have been applied, and acts as an entry point to an audit by drilldown functions that permit detailed results to be reviewed. The audit history is shown in FIG. 8B with screen 820, which displays additional details related to the CPPFOC (overlimit charges, see Table 1 above) method override, including information similar to that described above. FIG. 8C provides a illustration of a formatted-entry screen 840 that acts as an interface through which details of a method override may be entered. In this example, the potential method overrides correspond generally to pricing overrides and include potential overrides for cash-advance item charges (CPIOCI) 842, late fees (CPPFLC) 844, overlimit charges (CPPFOC) 846, returned-check charges (CPPFRC) 848, and minimum finance charges (CPICMF) 850 (See Table 1 above). For each of these potential overrides, a customer-service representative may enter details of the override, including whether any locks are applied at field 852. When locks are applied, a starting date for the lock may be specified as a "lock dt" 854 and an ending date, if applicable, for the lock may be specified as an "unlock dt" 856. The information provided by the customer service interface permits a customer service representative to provide explanatory information to customers who may inquire about changes to their account processing reflected by application or removal of a method override.

6. Estimator Engine

FIG. 1A indicates that in some embodiments, the server 105 may include an estimator engine 130 in addition to the decision engine 125. Such an estimator engine 130 enables a card issuer to test a set of decision rules without actually affecting any cardholder accounts. This is illustrated with the flow diagram of FIG. 9, which indicates that parameters are initially received by the estimator engine 130 at block 904 defining a hypothetical method-level processing scenario. For instance, in parallel with the exemplary embodiments described above, a card issuer may define the hypothetical scenario with a set of decision rules by building a set of lookup tables. The set of lookup tables (or individual tables within the set) may be large and complex, for instance, where several methods are overrideable or where a lookup table includes numerous decision elements. To verify that the lookup tables are selecting the desired accounts, a proposed lookup table or set of lookup tables may be stored in a test area within rules data store 115.

The estimator engine 130 may then determine the effect of the hypothetical scenario at block 908 by performing table lookup operations on the tables in the test area using account data from some or all of the account records in account data store 110. The operation of the estimator engine 130 may thus be similar to process 600, without the account-updating steps (steps 610-615) being performed. Instead, information about which accounts return which results is compiled as a report summarizing the effect of the hypothetical scenario at block 912, and is presented to the card issuer, e.g., via user interface 120. One example of a screen shot showing a report generated by the estimator engine 130 for a hypothetical processing scenario is provided in FIG. 9B. Information compilation and presentation may be performed using any suitable data-gathering and presentation tools and methods. The information provided may enable the card issuer to verify that the proposed lookup tables are performing as intended. In some instances, the information may simply be used to evaluate the potential scope of a proposed change. For example, a proposal to modify the annual fee for certain classes of accounts may be provided as a hypothetical scenario to the estimator engine, which allows the effect to be examined for individual accounts or across a portfolio as a whole. A conclusion that the change affects only a few accounts may prompt a different response to the proposal than a conclusion that the change affects millions of accounts.

In some embodiments, use of the estimator engine 130 also allows edit checks to be performed to determine whether a combination of processing methods and/or method overrides that could be applied to an account creates a conflict. A conflict may occur, for instance, when a method override is inconsistent with another method or method override, with industry rules, or with government regulations. For purposes of edit checking, the estimator engine 130 may be used to determine all combinations of method overrides that may be applied to an account. Each possible combination is then tested for conflicts by reviewing selected parameter values resulting from the combination.

The following example illustrates the edit check process. Suppose that a card issuer defines an interest rate method override with parameter values establishing that interest accrues daily based on the average daily balance, and suppose that the default statement production method has parameter values establishing that the statement displays only a monthly average balance and reports interest accruing monthly. If this interest rate method override and this statement production method were simultaneously applied to a cardholder account, the statement would not accurately reflect the interest charge. The conflict can be avoided if the decision rules pertaining to the interest rate and statement production methods preclude this combination. If, however, the decision rules do not preclude this combination, then the respective parameters of the interest rate method override and the statement production method would be compared, and the conflict would be detected.

Likewise, other comparisons of parameter values may also be implemented to detect other types conflicts. For example, an industry rule may provide that cash advance transactions cannot be included in a daily balance computation. If a card issuer defines a method override that sets a parameter value causing cash advances to be included in the daily balance computation, the edit checking process detects this conflict by inspecting the values of the parameters set by the method override. Upon detecting a conflict, a warning message is generated, identifying the conflict. The card issuer is then able to adjust the parameter values set by the methods and/or method overrides in order to eliminate the conflict before any accounts are affected. In some instances (such as the interest rate and statement production example given above), the card issuer may also be able to eliminate the conflict by modifying the decision rules to prevent a conflicting combination of methods and/or method overrides from occurring. Whether the conflict prevents a proposed set of decision rules and method overrides from being implemented may depend on the severity of the conflict. In one exemplary embodiment, the edit check process identifies each conflict as either an error or an exception. An "error" causes a warning but does not require the card issuer to eliminate the conflict before proceeding. An "exception" requires modification and may be generated, for instance, when a conflict renders a computation impossible (e.g., dividing by zero) or results in illegal activity (e.g., interest rates in violation of applicable usury laws).

While the invention has been described with respect to exemplary embodiments, one skilled in the art will recognize that numerous modifications are possible. For instance, the present invention may be used to manage account processing methods and method overrides associated with any aspect of account processing in addition to those discussed explicitly. Likewise, a method override may modify one, all, or any number of the parameters of its associated account processing method. Further, while the invention has been described with reference to credit card accounts, it will be appreciated that the invention may be applied to other types of financial products that have associated terms and conditions or other processing parameters that may be varied, such as loans or deposit accounts. In addition, the invention may be practiced by a third party that provides services to one or more account issuers. Accordingly, the above description should not be taken as limiting the scope of the invention, which is defined in the following claims.

What is claimed is:

1. A method for managing a financial account, the method comprising:
maintaining account information for the financial account on a host system, wherein the account information includes a set of account parameter values and a specification of a base account processing strategy;
overriding at least a portion of the base account processing strategy with the host system by accessing an entry in a lookup table maintained on a storage device in communication with the host system, the entry being defined by at least one of the account parameter values, and implementing an operation specified by the entry and inconsistent with operations specified by the base account processing strategy; and reverting to the base account processing strategy with the host system in response to satisfaction of a predetermined trigger condition, wherein the lookup table comprises a plurality of lookup tables, and accessing an entry in the lookup table comprises:

accessing an entry in a first of the plurality of lookup tables, the entry in the first of the plurality of lookup tables being accessed based on a first set of at least three decision elements, wherein:

each financial account decision element indicates a cardholder characteristic and each of the first set of at least three decision elements are used to select the entry in the first of the plurality of lookup tables; and accessing an entry in a second of the plurality of lookup tables based on a second set of at least two decision elements, each decision element of the second set of decision elements being different from each decision element of the first set of decision elements, wherein the second of the plurality of lookup tables is identified by the entry in the first of the plurality of lookup tables; and implementing the operation specified by the entry comprises implementing an operation specified by the entry in the second of the plurality of lookup tables.

2. The method recited in claim 1 further comprising receiving account usage information for the financial account with the host system, wherein the entry is further defined by the account usage information.

3. The method recited in claim 1 wherein:

overriding the at least a portion of the base account processing strategy comprises specifying a temporal lock period; and reverting to the base account processing strategy is performed after passage of the temporal lock period.

4. A method for managing a financial account, the method comprising:

maintaining account information for the financial account on a host system, wherein the account information includes a set of account parameter values and a specification of a base account processing strategy;

overriding at least a portion of the base account processing strategy with the host system by accessing an entry in a lookup table maintained on a storage device in communication with the host system, the entry being defined by at least one of the account parameter values, and implementing an operation specified by the entry and inconsistent with operations specified by the base account processing strategy; and recording, with the host system, a temporal lock period measured from a time of overriding the at least a portion of the base account processing strategy during which the overriding is prohibited from being removed, wherein the lookup table comprises a plurality of lookup tables, and accessing an entry in the lookup table comprises:

accessing an entry in a first of the plurality of lookup tables, the entry in the first of the plurality of lookup tables being accessed based on a first set of at least three decision elements, wherein:

each financial account decision element indicates a cardholder characteristic and each of the first set of at least three decision elements are used to select the entry in the first of the plurality of lookup tables; and accessing an entry in a second of the plurality of lookup tables based on a second set of at least two decision elements, each decision element of the second set of decision elements being different from each decision element of the first set of decision elements, wherein the second of the plurality of lookup tables is identified by the entry in the first of the plurality of lookup tables; and implementing the operation specified by the entry comprises implementing an operation specified by the entry in the second of the plurality of lookup tables.

5. The method recited in claim 4 further comprising:

identifying the occurrence of a predetermined trigger condition with the host system;

determining, with the host system, whether a time of occurrence of the predetermined trigger condition is within the temporal lock period; and reverting to the base account processing strategy with the host system in response to the occurrence of the predetermined trigger condition if the time of occurrence of the predetermined trigger condition is within the temporal lock period.

6. The method recited in claim 4 further comprising receiving account usage information for the financial account with the host system, wherein the entry is further defined by the account usage information.

7. The method recited in claim 4 wherein the temporal lock period is finite.

8. The method recited in claim 4 wherein the temporal lock period is indefinite.

9. A method for managing a financial account, the method comprising:

maintaining account information for the financial account on a host system, wherein the account information includes a set of account parameter values and a specification of a base account processing strategy;

receiving account usage information for the financial account with the host system;

overriding at least a portion of the base account processing strategy with the host system by:

accessing an entry in a first of a plurality of lookup tables maintained on a storage device in communication with the host system, the entry in the first of the plurality of lookup tables being accessed based on a first set of at least three decision elements, wherein:

each financial account decision element indicates a cardholder characteristic and each of the first set of at least three decision elements are used to select the entry in the first of the plurality of lookup tables; and accessing an entry in a second of the plurality of lookup tables based on a second set of at least two decision elements, each decision element of the second set of decision elements being different from each decision element of the first set of decision elements, wherein the second of the plurality of lookup tables is identified by the entry in the first of the plurality of lookup tables;

implementing an operation specified by the entry in the second of the lookup tables and inconsistent with operations specified by the base account processing strategy;

recording, with the host system, a temporal lock period measured from a time of overriding the at least a portion of the base account processing strategy during which the overriding is prohibited from being removed;

identifying the occurrence of a predetermined trigger condition with the host system;

determining, with the host system, that a time of occurrence of the predetermined trigger condition is later than the temporal lock period; and reverting to the base account processing strategy with the host system in response to the occurrence of the predetermined trigger condition.

10. A method of maintaining a plurality of financial accounts, the method comprising:

maintaining account information for each of the plurality of accounts on a storage device, wherein the account information for each account includes a set of respective account parameter values and a specification of a respective base account processing strategy;

receiving multiple hypothetical lookup tables with a host system in communication with the storage device, the hypothetical lookup tables corresponding to a hypothetical processing scenario for the plurality of accounts;

determining which of the plurality of accounts have account information with respective account parameter values that would result in a change in the respective base account processing strategy by applying the account-processing override specified by the entries in the hypothetical lookup tables defined by the respective account parameter values, wherein determining which of the plurality of accounts with respective account parameter values that would result in the change comprises, for each account:

accessing an entry in a first lookup table, the entry in the first lookup table being accessed based on a first set of at least three decision elements, wherein:

each financial account decision element indicates a cardholder characteristic and each of the first set of at least three decision elements are used to select the entry in the first lookup table; and accessing an entry in a second lookup table based on a second set of at least two decision elements, each decision element of the second set of decision elements being different from each decision element of the first set of decision elements, wherein the second lookup table is identified by the entry in the first lookup table; and generating a report summarizing results of the determining.

11. The method recited in claim 10 further comprising maintaining respective account usage information for each of the plurality of accounts on the storage device, wherein entries within the hypothetical lookup tables are further defined by account usage information.

\* \* \* \* \*